US012761721B2

(12) United States Patent
D'Amato et al.

(10) Patent No.: US 12,761,721 B2
(45) Date of Patent: Oct. 13, 2026

(54) MOOD DETECTION AND/OR INFLUENCE VIA AUDIO PLAYBACK DEVICES

(71) Applicant: Sonos, Inc., Goleta, CA (US)

(72) Inventors: Nicholas D'Amato, Santa Barbara, CA (US); Dayn Wilberding, Portland, OR (US)

(73) Assignee: Sonos, Inc., Goleta, CA (US)

( * ) Notice: Subject to any disclaimer, the term of this patent is extended or adjusted under 35 U.S.C. 154(b) by 45 days.

(21) Appl. No.: 18/041,850

(22) PCT Filed: Aug. 24, 2021

(86) PCT No.: PCT/US2021/071260
§ 371 (c)(1),
(2) Date: Feb. 16, 2023

(87) PCT Pub. No.: WO2022/047468
PCT Pub. Date: Mar. 3, 2022

(65) Prior Publication Data

US 2023/0315194 A1 Oct. 5, 2023

Related U.S. Application Data

(60) Provisional application No. 62/706,544, filed on Aug. 24, 2020.

(51) Int. Cl.
*G06F 3/01* (2006.01)
*G06F 3/16* (2006.01)

(52) U.S. Cl.
CPC .............. *G06F 3/011* (2013.01); *G06F 3/165* (2013.01); *G06F 2203/011* (2013.01)

(58) Field of Classification Search
None
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.
(Continued)

*Primary Examiner* — Walter F Briney, III
(74) *Attorney, Agent, or Firm* — Fortem IP LLP

(57) ABSTRACT

In some embodiments, a method comprises receiving a first signal indicative of a current emotional state of one or more users, receiving a second signal corresponding to a desired emotional state, and causing a playback device to play back generative audio. The method can further comprise, after receiving the first signal and the second signal, adjusting one or more audio characteristics of the generative audio to provide at least (i) a first portion of media content having a first parameter corresponding to the current emotional state, (ii) a second portion of media content having a second parameter different than the first parameter, and (iii) an nth portion of media content having an nth parameter corresponding to the desired emotional state.

21 Claims, 18 Drawing Sheets

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 10,481,858 B2 * | 11/2019 | Boulanger | G10L 25/63 |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2013/0243245 A1 | 9/2013 | Bill | |
| 2014/0164998 A1 | 6/2014 | Jadhav et al. | |
| 2015/0206523 A1 | 7/2015 | Song et al. | |
| 2021/0030308 A1 * | 2/2021 | Grace | A61B 5/486 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

International Bureau, International Search Report and Written Opinion mailed on Jan. 17, 2022, issued in connection with International Application No. PCT/US2021/071260, filed on Aug. 24, 2021, 13 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc. v. D&M Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

European Patent Office, European EPC Article 94.3 mailed on Sep. 18, 2024, issued in connection with European Application No. 21806914.4, 10 pages.

International Bureau, International Preliminary Report on Patentability and Written Opinion, mailed on Mar. 9, 2023, issued in connection with International Application No. PCT/US2021/071260, filed on Aug. 24, 2021, 10 pages.

* cited by examiner

MOOD DETECTION AND/OR INFLUENCE VIA AUDIO PLAYBACK DEVICES

CROSS-REFERENCE TO RELATED APPLICATION

This application is a 371 U.S. national phase application of International Application No. PCT/US2021/071260, filed Aug. 24, 2021, which claims the benefit of priority to U.S. Patent Application No. 62/706,544, filed Aug. 24, 2020, which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
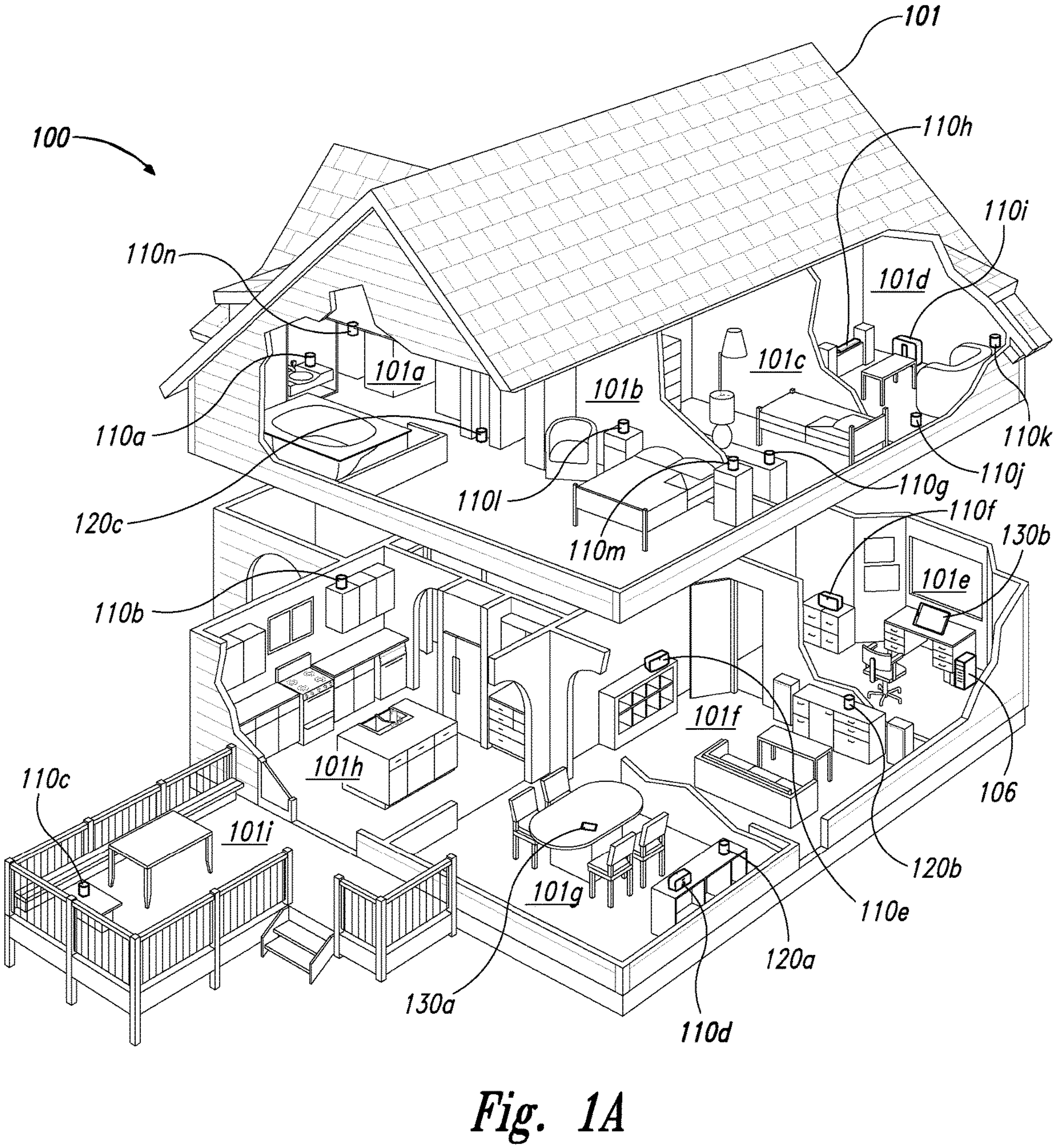
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Music and other media content can significantly affect a user's emotional state. Various attempts have been made to curate playlists of media content that are intended to direct a user's mood or other mental states (e.g., a mood-lifting playlist intended to raise a user's spirits, a study playlist intended to increase a user's concentration, etc.). However, the effects of a particular song or other media content may depend greatly on a user's present emotional state. For example, a user in a current state of severe depression user may be unmoved or even annoyed at hearing a cheerful, upbeat pop song. Accordingly, it can be useful to select songs or other media items that affect a user's mood incrementally or gradually, with each subsequent song intended to shift the user's mood closer towards a desired emotional state.

Additionally, current devices for influencing a user's emotional state via audio playback do not consider changes in the user's current emotional state during the playback. As such, current devices are unable to determine in real time the effect the audio playback is having on the user, and thus whether the playback is having the intended effect on the user's emotional state. Moreover, different users may respond differently to the same media content. For example, one user's mood may improve markedly upon listening to "Wake Up" by Arcade Fire, while another user's mood may darken in response to the same song. As a result, it can be useful to monitor a user's emotional state in real time during playback of media content intended to induce a desired emotional state in a user. Depending on the detected shifts in the user's emotional state, the playlist may be updated dynamically to achieve the desired gradual shifts in the user's mood.

Embodiments of the present technology address at least some of the above described issues, and generally relate to improved systems and methods for generating a playlist of media content to be played via a playback device. The generated playlist is based at least in part on a current emotional state of one or more users and/or desired emotional state. The generated playlist can be configured to influence and/or gradually transition the emotional state of the one or more users from the current emotional state to the desired emotional state.

Some embodiments of the present technology relate to receiving a first signal indicative of a current emotional state of a user, receiving a second signal corresponding to a desired emotional state of the user, and, based at least in part of the first and second signals, generating a playlist of media content. The first signal can be received from a sensor (e.g., a wearable brain sensing band) worn by the user. In some embodiments, generating the playlist comprises selecting items of media content including at least (i) a first item of media content having a first parameter corresponding to the current emotional state of the user, (ii) a second item of media content having a second parameter different than the first parameter, and (iii) an nth item of media content having an nth parameter corresponding to the desired emotional state of the user. The generated playlist is arranged in a sequential order such that the playlist transitions from the first item toward the nth item. The playlist can then be played back via a playback device. During playback, the user's current emotional state may be received, e.g., to determine whether the playlist is having an intended effect on the user and/or if the user's emotional state is gradually transitioning toward the desired emotional state. If the user's emotional state is gradually transitioning away from the desired emotional state or in an unexpected manner, the playlist may be updated.

As explained in more detail below, generating the playlist in such a manner, and playing back the playlist to the user, provides an improved ability to influence the emotional state of the user, e.g., from the current emotional state toward the desired emotional state. Unlike current devices or methods for influencing a user's emotional state, embodiments of the present technology consider the current and desired emotional states of the user, and play media content of the generated playlist to gradually influence the user's emotional state along a pathway that includes the current and desired emotional states. In doing so, the user's current emotional state is continuously and/or iteratively considered such that the playlist can be continuously updated during playback as necessary to ensure the user's emotional state gradually transitions toward the desired emotional state.

Some embodiments of the present technology can further relate to providing media content that includes generative audio. As explained elsewhere herein, generative audio can be created at least in part via an algorithm and/or non-human system that utilizes a rule-based calculation. As such, generative audio can be endless and/or dynamic audio that is altered in real time as inputs (e.g., parameters associated with the first, second, and/or other signals described herein) to the algorithm change. For example, generative audio can be used to direct a user's mood toward a desired emotional state, with one or more characteristics of the generative audio varying in response to real-time measurements reflective of the user's emotional state. As used in embodiments of the present technology, the system can provide generative audio based on the current and/or desired emotional states of a user. For example, an exemplary method can include receiving a first signal indicative of a current emotional state of one or more users, receiving a second signal corresponding to a desired emotional state, and causing a playback device to play back generative audio. After receiving the first signal and the second signal, one or more audio characteristics of the generative audio can be adjusted to provide at least (i) a first portion of media content having a first parameter corresponding to the current emotional state, (ii) a second portion of media content having a second parameter different than the first parameter, and (iii) an nth portion of media content having an nth parameter corresponding to the desired emotional state. In doing so, embodiments of the present technology can provide generative audio and/or alter acoustic characteristics of existing media items to provide media content that gradually transitions a user toward a desired emotional state.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and/or output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers or one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the outdoor patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
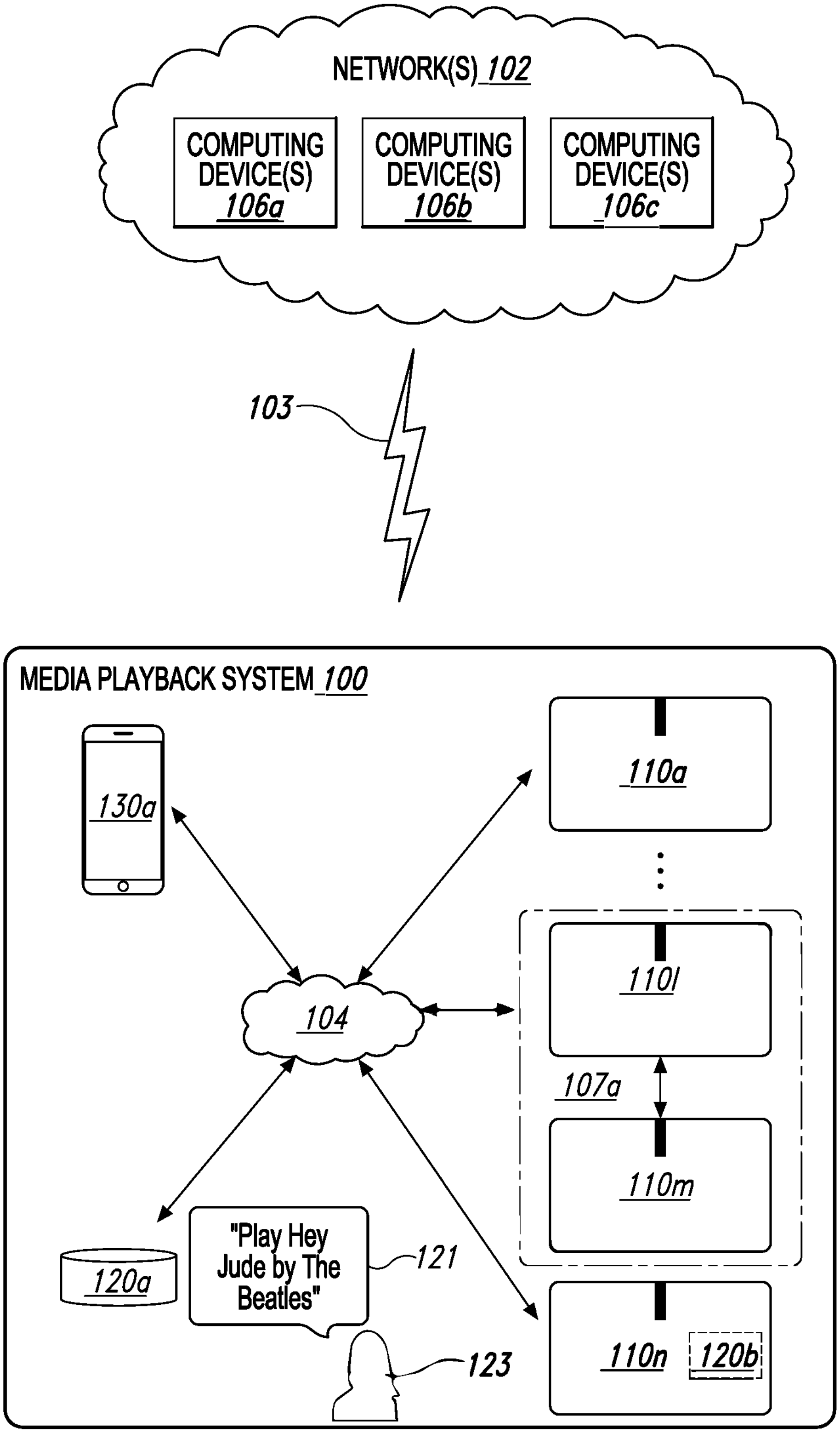
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, NMDs 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
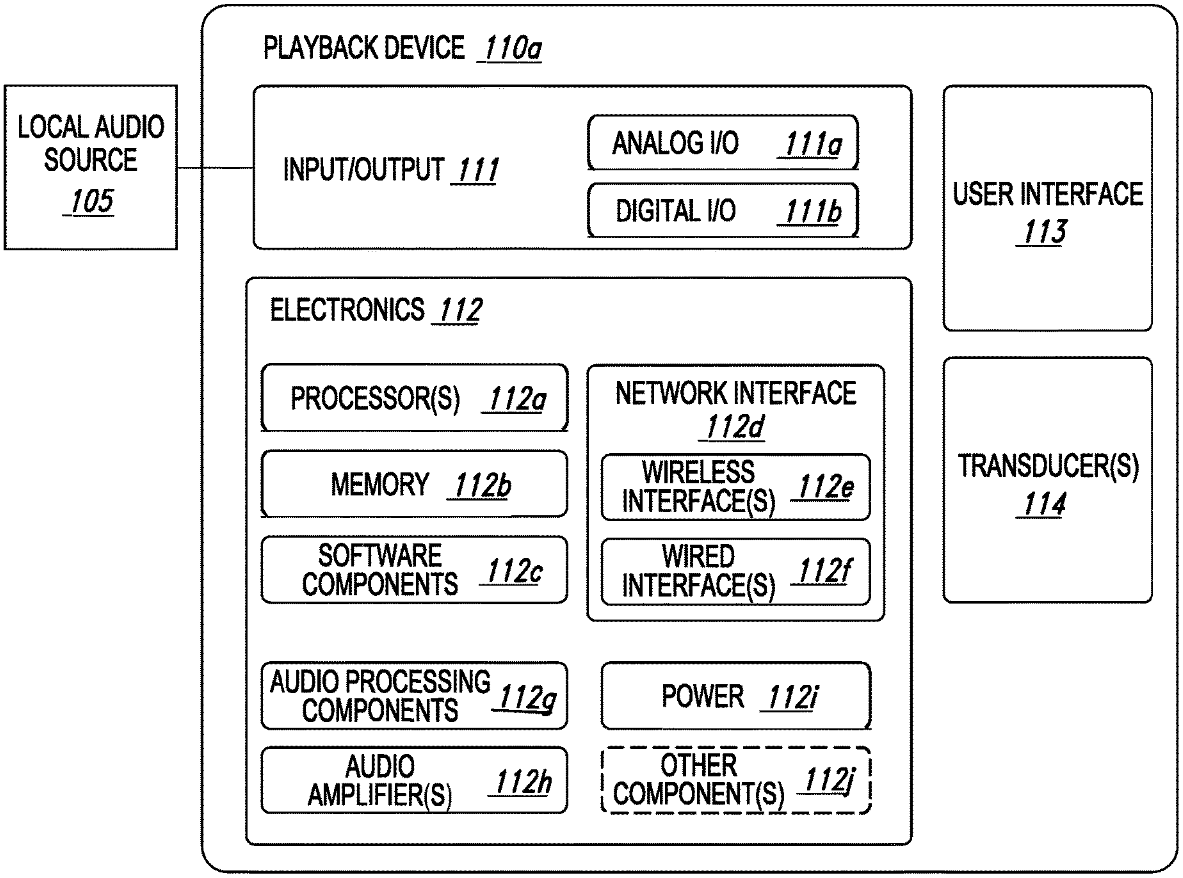
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111$b$ comprises a High-Definition Multimedia Interface (HDMI) interface and/or cable. In some embodiments, the digital I/O 111$b$ includes one or more wireless communication links comprising, for example, a radio frequency (RF), infrared, WiFi, Bluetooth, or another suitable communication protocol. In certain embodiments, the analog I/O 111$a$ and the digital 111$b$ comprise interfaces (e.g., ports, plugs, jacks) configured to receive connectors of cables transmitting analog and digital signals, respectively, without necessarily including cables.

The playback device 110$a$, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110$a$ does not include an input/output 111 and receives all audio content via the network 104.

The playback device 110$a$ further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106$a$-$c$ via the network 104 (FIG. 1B)), amplify the received audio, and output the amplified audio for playback via one or more of the transducers 114. In some embodiments, the playback device 110$a$ optionally includes one or more microphones 115 (e.g., a single microphone, a plurality of microphones, a microphone array) (hereinafter referred to as "the microphones 115"). In certain embodiments, for example, the playback device 110$a$ having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112$a$ (referred to hereinafter as "the processors 112$a$"), memory 112$b$, software components 112$c$, a network interface 112$d$, one or more audio processing components 112$g$ (referred to hereinafter as "the audio components 112$g$"), one or more audio amplifiers 112$h$ (referred to hereinafter as "the amplifiers 112$h$"), and power 112$i$ (e.g., one or more power supplies, power cables, power receptacles, batteries, induction coils, Power-over Ethernet (POE) interfaces, and/or other suitable sources of electric power). In some embodiments, the electronics 112 optionally include one or more other components 112$j$ (e.g., one or more sensors, video displays, touchscreens, battery charging bases).

The processors 112$a$ can comprise clock-driven computing component(s) configured to process data, and the memory 112$b$ can comprise a computer-readable medium (e.g., a tangible, non-transitory computer-readable medium, data storage loaded with one or more of the software components 112$c$) configured to store instructions for performing various operations and/or functions. The processors 112$a$ are configured to execute the instructions stored on the memory 112$b$ to perform one or more of the operations. The operations can include, for example, causing the playback device 110$a$ to retrieve audio data from an audio source (e.g., one or more of the computing devices 106$a$-$c$ (FIG. 1B)), and/or another one of the playback devices 110. In some embodiments, the operations further include causing the playback device 110$a$ to send audio data to another one of the playback devices 110$a$ and/or another device (e.g., one of the NMDs 120). Certain embodiments include operations causing the playback device 110$a$ to pair with another of the one or more playback devices 110 to enable a multi-channel audio environment (e.g., a stereo pair, a bonded zone).

The processors 112$a$ can be further configured to perform operations causing the playback device 110$a$ to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110$a$ and the other one or more other playback devices 110. Additional details regarding audio playback synchronization among playback devices can be found, for example, in U.S. Pat. No. 8,234,395, which was incorporated by reference above.

In some embodiments, the memory 112$b$ is further configured to store data associated with the playback device 110$a$, such as one or more zones and/or zone groups of which the playback device 110$a$ is a member, audio sources accessible to the playback device 110$a$, and/or a playback queue that the playback device 110$a$ (and/or another of the one or more playback devices) can be associated with. The stored data can comprise one or more state variables that are periodically updated and used to describe a state of the playback device 110$a$. The memory 112$b$ can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112$d$ is configured to facilitate a transmission of data between the playback device 110$a$ and one or more other devices on a data network such as, for example, the links 103 and/or the network 104 (FIG. 1B). The network interface 112$d$ is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112$d$ can parse the digital packet data such that the electronics 112 properly receives and processes the data destined for the playback device 110$a$.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
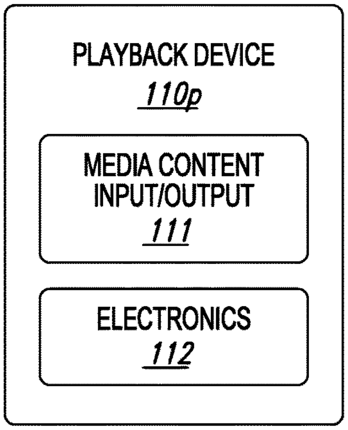
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
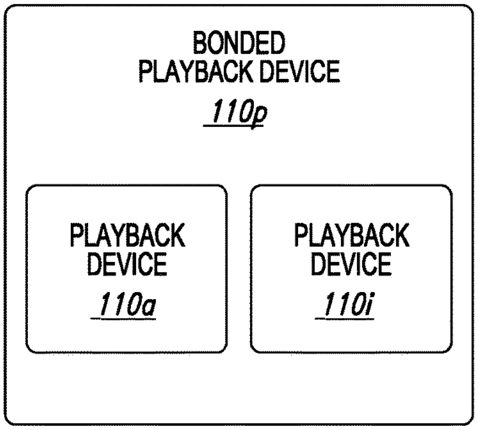
FIG. 1E is a block diagram of a bonded playback device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

Figure 1F:
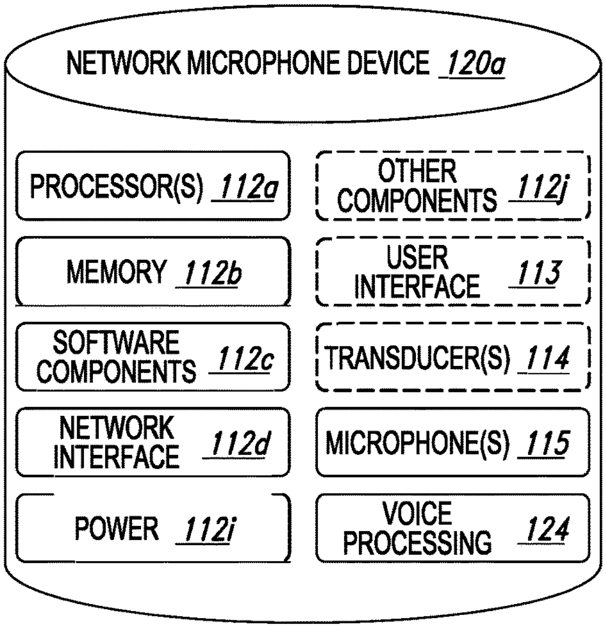
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
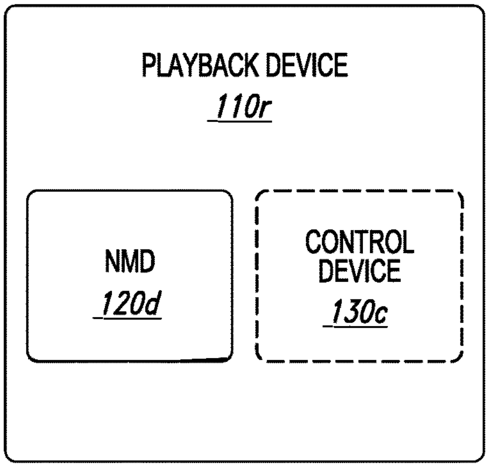
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
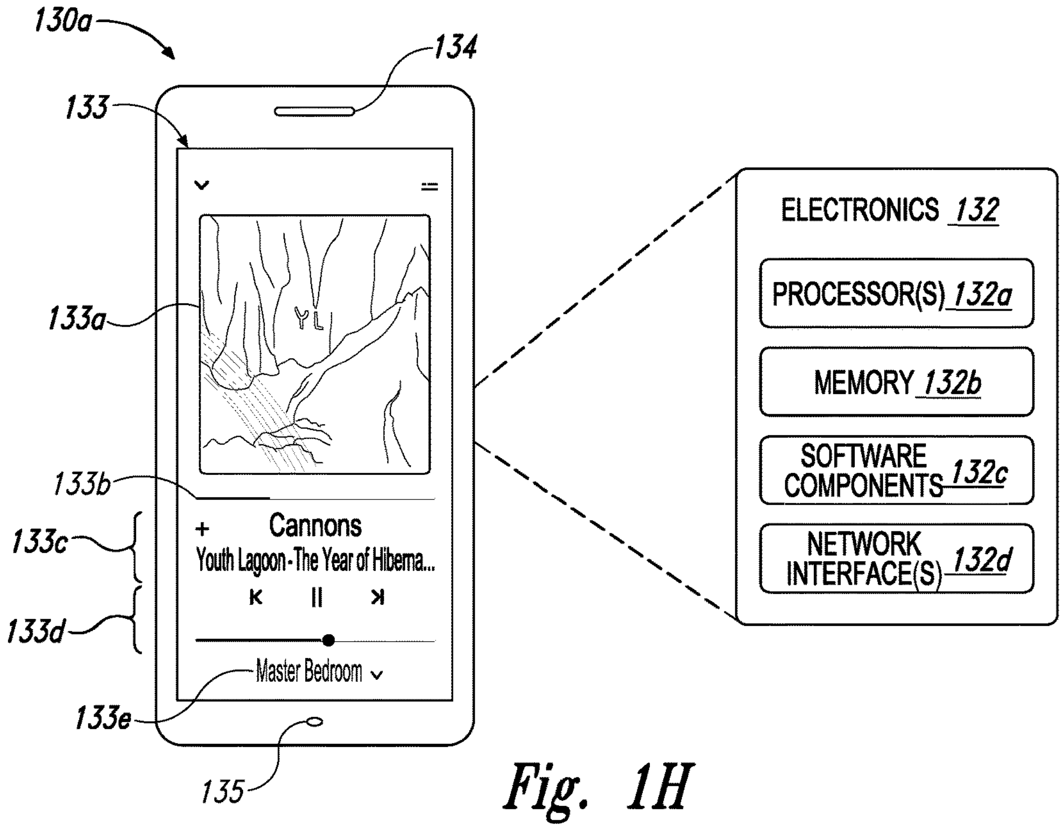
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 112*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Methods for Generating Media Content Based on an Emotional State A playback device can be configured to generate a playlist of media content based at least in part on (i) a received first signal indicative of a user's current emotional state and (ii) a received second signal indicative of a user's desired emotional state. The generated playlist can be played back via a playback device, as previously described, to influence the user's emotional state from the current emotional state toward and/or to the desired emotional state. As explained in detail elsewhere herein, the user's emotional state can be constantly or periodically monitored and considered by the system as media content is played for the user. In doing so, the system can determine whether the playlist is having an intended effect on the user and/or whether the playlist needs to be updated. Although several embodiments of the present technology relate to methods for generating such a playlist via a playback device, in some embodiments a control device (e.g., the control device 130; FIG. 1B), a remote computing device (e.g., the remote computing device 106; FIG. 1B), or any other components of a media playback system can generate such a playlist. Additionally, in some embodiments the generated playlist may be played back via the playback device that generated the playlist or via any other playback device(s).

Figure 2:
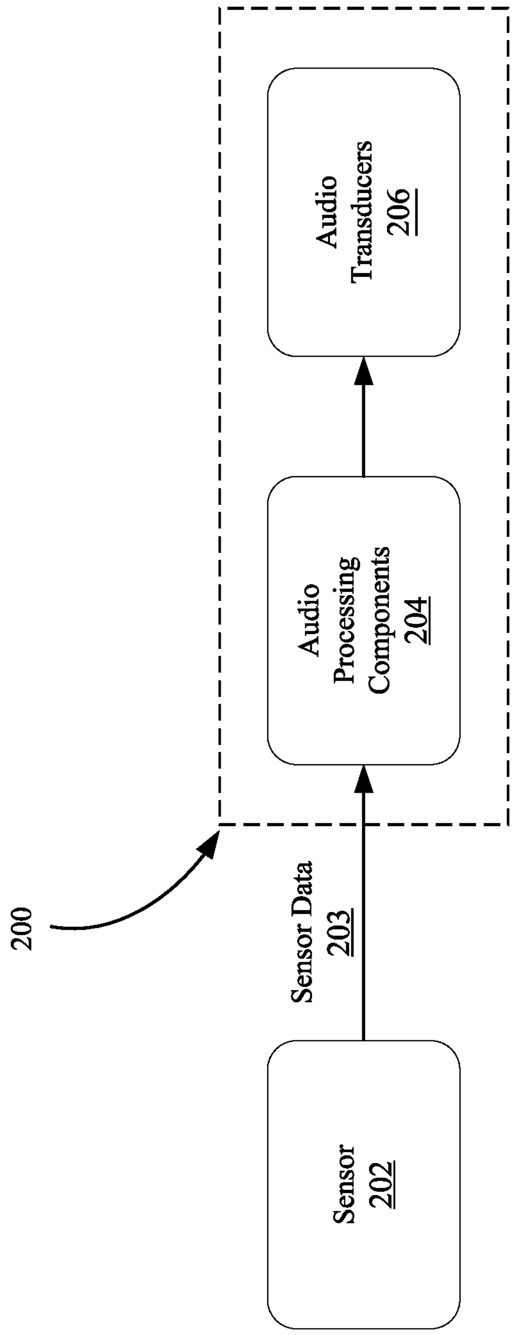
FIG. 2 is a schematic block diagram of a system for receiving sensor data from a sensor, in accordance with embodiments of the disclosed technology.

FIG. 2 is a schematic block diagram of a system 200 for receiving sensor data 203 from a sensor 202, in accordance with embodiments of the disclosed technology. In some embodiments, the system 200 can form a part of the electronics 112 of the playback device 110*a*, as previously described with reference to FIG. 1C. The sensor 202 can be a wearable sensor configured to worn or carried by a user, such as a headset, watch, mobile device, brain-machine interface (e.g., Neuralink), headphone, microphone, or other similar device. In some embodiments, the sensor 202 can be a non-wearable sensor or fixed to a stationary structure. The sensor 202 can provide the sensor data 203, which can include data corresponding to, for example, brain activity, voice, location, movement, heart rate, pulse, body temperature, and/or perspiration. In some embodiments, the sensor 202 can correspond to a plurality of sensors. For example, as explained elsewhere herein, the sensor 202 may correspond to a first sensor worn by a first user, a second sensor worn by a second user, and a third sensor not worn by a user (e.g., fixed to a stationary or structure). In such embodiments, the sensor data 203 can correspond to a plurality of signals received from each of the first, second, and third sensors.

As shown in FIG. 2, the sensor data 203 produced via the sensor 202 is received by one or more processing components 204 of the system 200. The sensor data 203 can be wirelessly provided to the processing components 204 via any of the wireless networks previously described (e.g., WiFi, Bluetooth, Z-Wave, ZigBee, and/or other suitable wireless communication protocol networks). Processed data from the processing components 204 can then be provided to audio transducers 206 of the playback device 110*a*, e.g., for audio playback. For example, as explained in more detail elsewhere herein, the processing components 204 can generate a playlist of media content based at least in part on the sensor data 203, and the generated playlist can be provided to the audio transducers 206 for audio playback.

Figure 3:
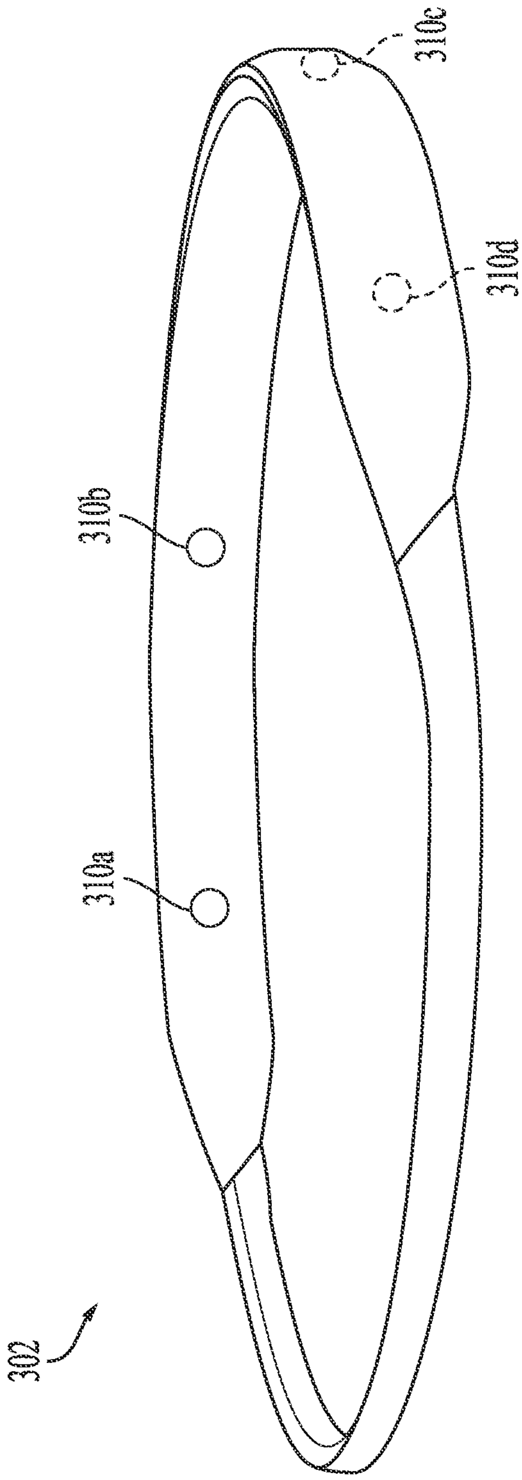
FIG. 3 is a partially schematic illustration of a wearable brain sensing headband, in accordance with embodiments of the present technology.

The sensor 202 is configured to generate information generally corresponding to a user's mood or emotional state. FIG. 3 is a partially schematic illustration of a wearable brain sensing headband 302, which is one of many examples of the sensor 202 described with reference to FIG. 2. As shown in FIG. 3, the headband 302 (e.g., an electroencephalography (EEG) headband) includes sensors 310*a-d*, each of which are configured to receive data from the user that corresponds to the sensor data 203 referred to in FIG. 2. Although four sensors are illustrated in FIG. 3, some embodiments may include fewer (e.g., one, two or three) or more (e.g., five, six, seven) sensors. In some embodiments, the headband 302 can correspond to any of the Muse™ headbands (InteraXon; Toronto, Canada). As shown in FIG. 3, the sensors 310*a-d* can be positioned at varying locations around an inner surface of the headband 302, e.g., to correspond to different brain anatomy (e.g., the frontal, parietal, temporal, and sphenoid bones) of the user. As such. each of the sensors 310*a-d* can receive different data from the user. Each of the sensors 310*a-d* can correspond to individual channels that can be streamed from the headband 302 to the system 200 (FIG. 2). Alternatively, individual sensors 310*a-d* can be combined with other individual sensors 310*a-d* to form one or more channels. For example, sensors 310*a*, 310*b* can be combined to form a first channel (e.g., a "left channel") and sensors 310*c*, 310*d* can be combined to form a second channel (e.g., a "right channel"). In such embodiments, the sensor data 203 can include data from one or more distinct channels.

Referring back to FIG. 2, the processing components 204 receive and process the sensor data 203 such that one or more parameters (referred to herein as a "parameter") is produced from the sensor data 203. As described in more detail elsewhere herein, the system can use the parameter to determine an emotional state of the user. In some embodiments, processing the sensor data 203 can include performing fast Fourier transform (FFT) operations on at least a portion of the sensor data 203 (e.g., on each channel stream of the sensor data 203), e.g., to calculate a power density of individual signals or an aggregate signal of the sensor data 203. Additionally or alternatively, processing the sensor data 203 can include splitting the calculated power density into multiple frequency bands. For example, in some embodiments the power density associated with the sensor data 203 may be split into five frequency bands including: (i) a gamma band corresponding to 32-100 hertz (Hz) signals, (ii) a beta band corresponding to 13-32 Hz signals, (iii) an alpha band corresponding to 8-13 Hz signals, (iv) a delta band corresponding to 4-8 Hz signals, and (v) a theta band corresponding to less than 4 Hz signals. In some embodiments, the system can then determine the relative power of each frequency band and/or the relative power of individual bands between different channels. As explained elsewhere herein, the system may then use data associated with the relative power to determine an emotional state of the user.

Figure 4:
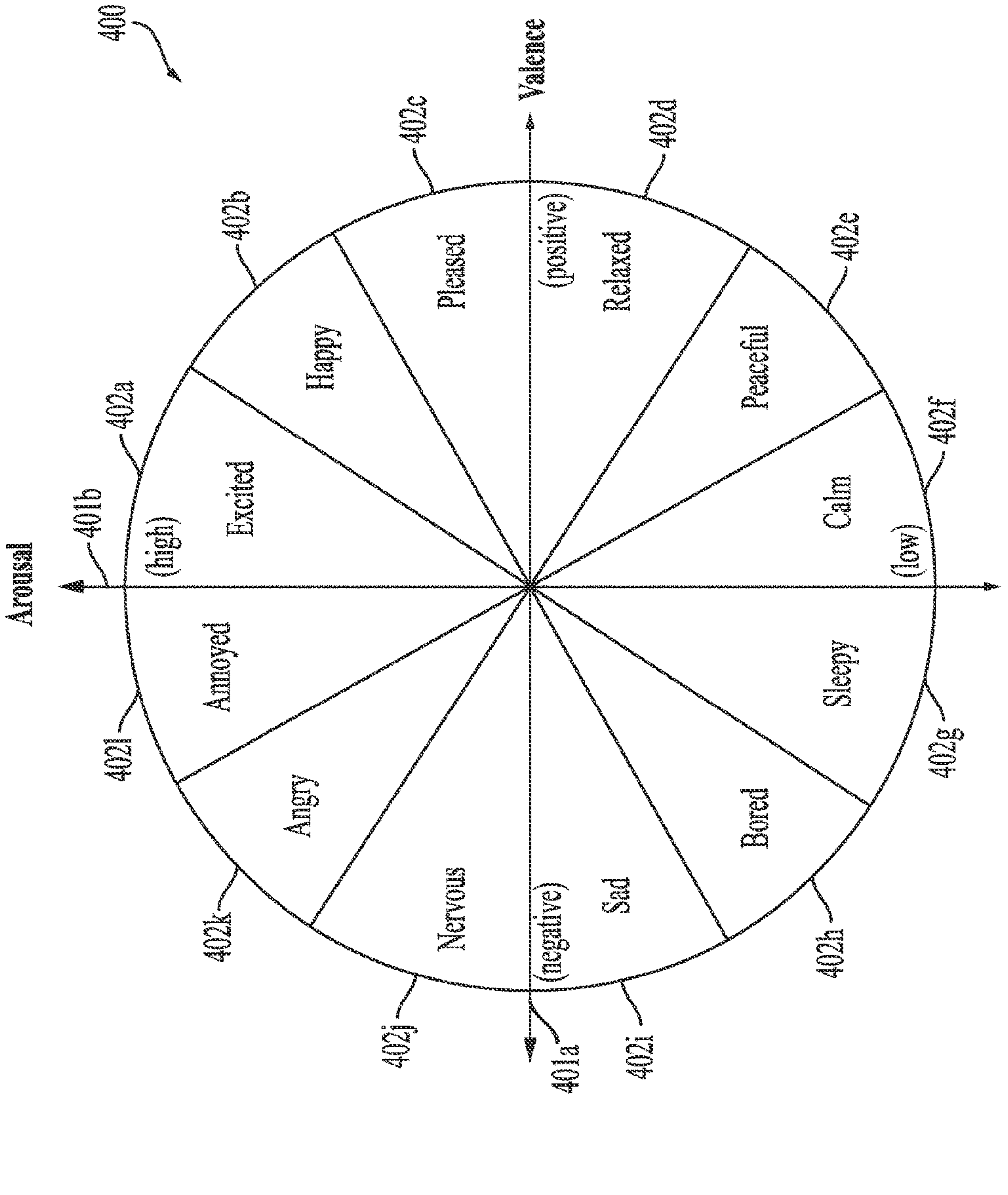
FIG. 4 is an illustration of an emotion classification plane, in accordance with embodiments of the present technology.

FIG. 4 is an illustration of an emotion classification plane 400, in accordance with embodiments of the present technology. As shown in FIG. 4, the plane 400 can generally correspond to a Valence-Arousal (VA) plane, with the horizontal axis 401*a* corresponding to negative and positive values for valence, and the vertical axis 401*b* corresponding to the high and low values for arousal. The plane 400 includes multiple sections 402*a-l* each corresponding to a distinct emotion. That is, section 402*a* corresponds to "excited," section 402*b* corresponds to "happy," section 402*c* corresponds to "pleased," section 402*d* corresponds to "relaxed," section 402*e* corresponds to "peaceful," section 402*f* corresponds to "calm," section 402*g* corresponds to "sleepy," section 402*h* corresponds to "bored," section 402*i* corresponds to "sad," section 402*j* corresponds to "nervous," section 402*k* corresponds to "angry," and section 402*l* corresponds to "annoyed." While the plane 400 includes 12 sections, in some embodiments the plane 400 can include fewer (e.g., four, five, etc.) or more (e.g., fifteen, twenty, etc.) sections. Additionally or alternatively, in other embodiments the plane 400 can correspond to an emotion classification plane different than the VA plane.

As described elsewhere herein, embodiments of the present technology are configured to process sensor data 203 (FIG. 2) received from a user and produce a parameter therefrom. In some embodiments, the produced parameter can correspond to a brain wave power density or other calculated value based at least in part on the sensor data 203. Additionally or alternatively, the produced parameter can correspond to a point or coordinate on the plane 400 such that the parameter is associated with one of the sections 402*a-l* and the associated emotion. As such, the plane 400, or more particularly the horizontal and vertical axes 401*a*, 401*b* of the plane 400, can correspond to processed data (e.g., relative power of frequency bands, relative power of individual bands of channels, etc.) determined by the system 200 (e.g., by the processing components 204), as described with reference to FIG. 2. In some embodiments, the horizontal and/or vertical axes 401*a*, 401*b* of the plane correspond to a range of values associated with ratios of data corresponding to individual channels, frequency bands, and/or relative powers.

For example, in some embodiments the horizontal axis 401*a* of the plane 400 corresponds to a range of values associated with a ratio of the "left channel" signals and "right channel" signals, with a higher ratio corresponding to a more positive value on the horizontal axis 401*a* and a low ratio corresponding to a more negative value on the horizontal axis 401*a*. The left channel can be indicative of brain activity levels in the user's left hemisphere or a portion thereof, and the right channel can be indicative of brain activity levels in the use's right hemisphere or a portion thereof. Because positive emotional states are associated with relatively higher activity levels in the right hemisphere (and conversely negative emotional states are associated with relatively higher activity levels in the left hemisphere), the ratio of these channels can be used to calculate an associated valence value along the horizontal axis 401*a* of the plane 400. Although the illustrated example utilizes left and right channels to calculate a valence score, in other embodiments different techniques can be used to assign values indicative of the valence of a user's emotional state. For example, the valence can be calculated by comparing certain frequency bands, by evaluating brain activity in different anatomical regions beyond left and right hemisphere, or any other suitable technique.

Additionally or alternatively, in some embodiments the vertical axis 401*b* of the plane 400 corresponds to a range of values associated with a ratio of (i) the relative power of the beta band signals, (ii) the relative power of the theta band signals, and (iii) the relative power of the alpha band signals. A higher ratio of these signals may correspond to a higher value on the vertical axis 401*b*. Because high levels of theta and alpha band signals are associated with low-arousal states (e.g. deep relaxation or sleepiness) and high levels of beta band signals are associated with high-arousal states (e.g., focused and alert), the ratio of these signals can be used to calculate an associated arousal value along the vertical axis 401*b* of the plane 400. Although the illustrated example utilizes beta, theta, and/or alpha signals to calculate an arousal score, in other embodiments different techniques can be used to assign values indicative of the arousal of a user's emotional state. For example, the arousal can be calculated by evaluating brain activity in one or more anatomical regions, by comparing certain frequency bands other than beta, theta, or alpha, or by using any other suitable technique.

Figure 5:
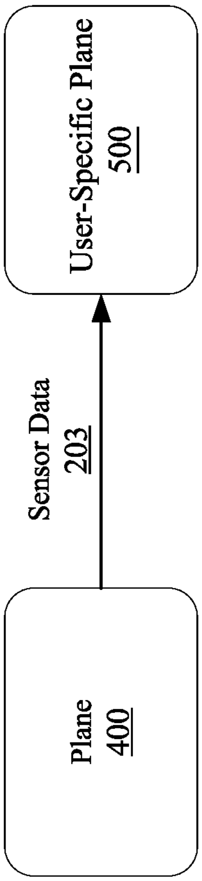
FIG. 5 is a schematic block diagram for generating a user-specific emotional classification plane, in accordance with embodiments of the present technology

In some embodiments, the plane 400 is tailored to correspond to a particular user. Because the sensor data associated with a given emotional state may be slightly different for each user, adjusting the plane 400 (e.g., the origin of the plane 400) for each user can beneficially improve the accuracy of determining a user's current emotional state and/or the pathway needed to obtain a desired emotional state. Stated differently, a state of calm for a first user may correspond to a first parameter value, whereas a state of calm for a second user may correspond to a second parameter value different than the first parameter value. FIG. 5 is a schematic block diagram for determining a neutral emotional state of a user and/or generating a user-specific emotion classification plane 500. As shown in FIG. 5, the plane 400 is adjusted to form the user-specific plane 500 based on the sensor data 203 previously described (e.g., with reference to FIG. 2). In some embodiments, the sensor data 203 used to generate the user-specific plane 500 can correspond to calibration data obtained from the user, e.g., by exposing the user to a calibration test or particular set of conditions. For example, predetermined media content items (e.g., audio content, songs, podcasts, generative music, video sounds, videos, etc.) considered to be "neutral" input or that expected to place the user in a "neutral state" can be played back to the user, and sensor data 203 can be obtained therefrom. In some embodiments, the predetermined media content items can be provided to the user, and responses from the user for each of the provided items may be received. In such embodiments, the responses from the user may be active responses (e.g., manual inputs provided via the user) or passive responses (e.g., signals provided via sensors without manual input from the user). The "neutral state" for that particular user can be determined based on the obtained sensor data 203, and the user-specific plane 500 can be generated therefrom. In some embodiments, the sensor data 203 corresponding to the user's "neutral state" is only obtained once, e.g., during an initial use, and is saved and applied automatically for future uses.

Figure 6:
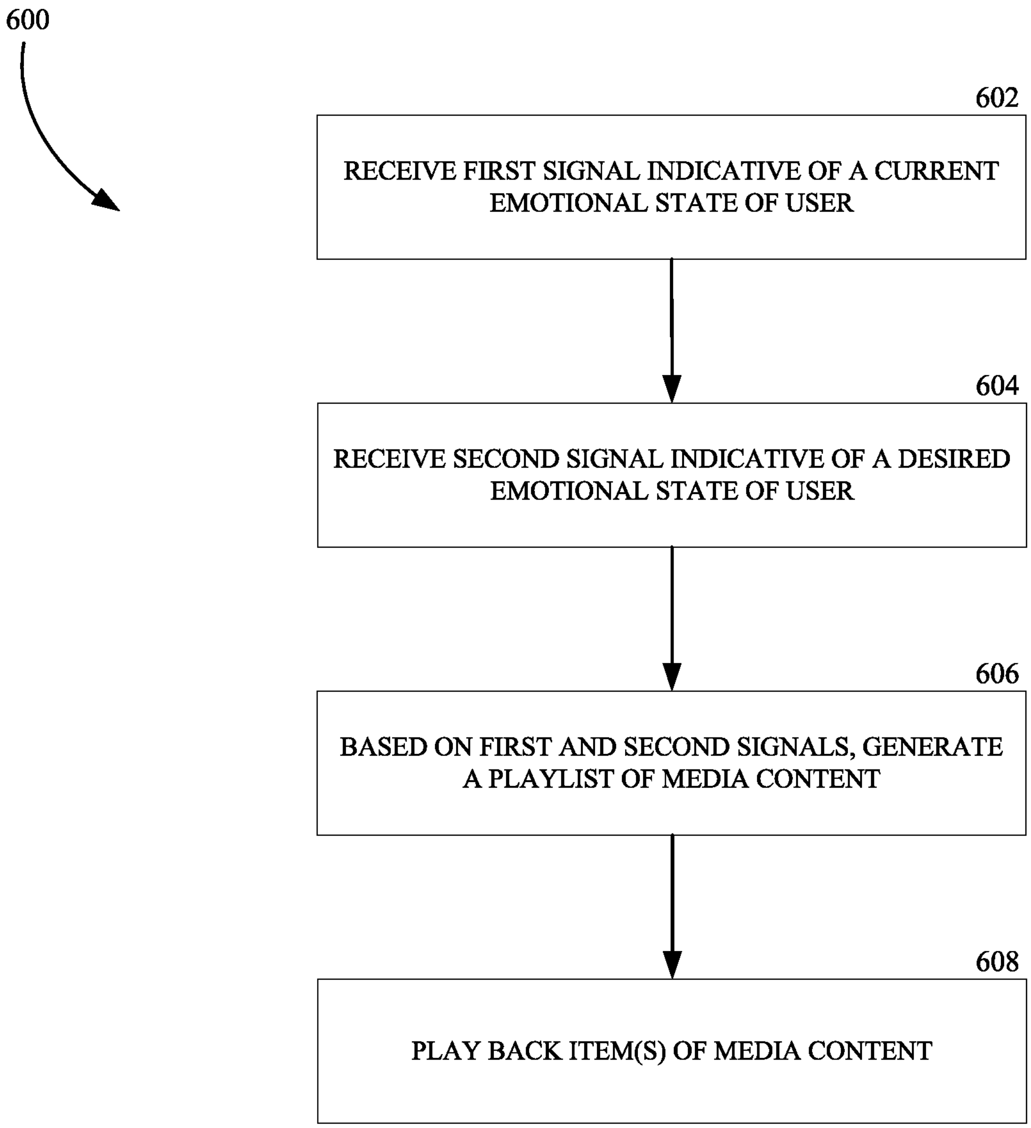
FIGS. 6-8 are flow diagrams of methods for generating a playlist of media content based at least in part on an emotional state of a user, in accordance with embodiments of the present technology.
Figure 7:
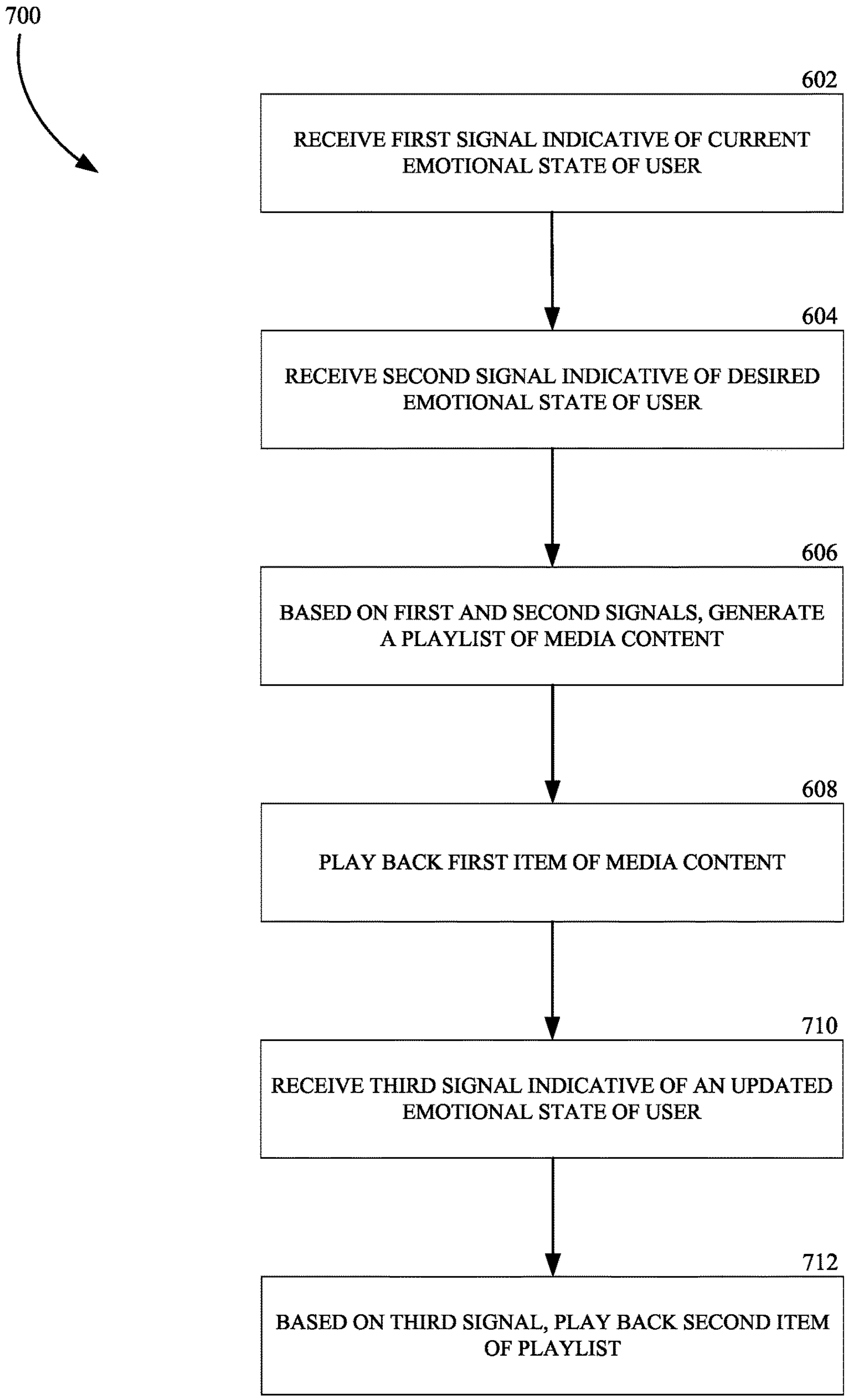
Figure 8:
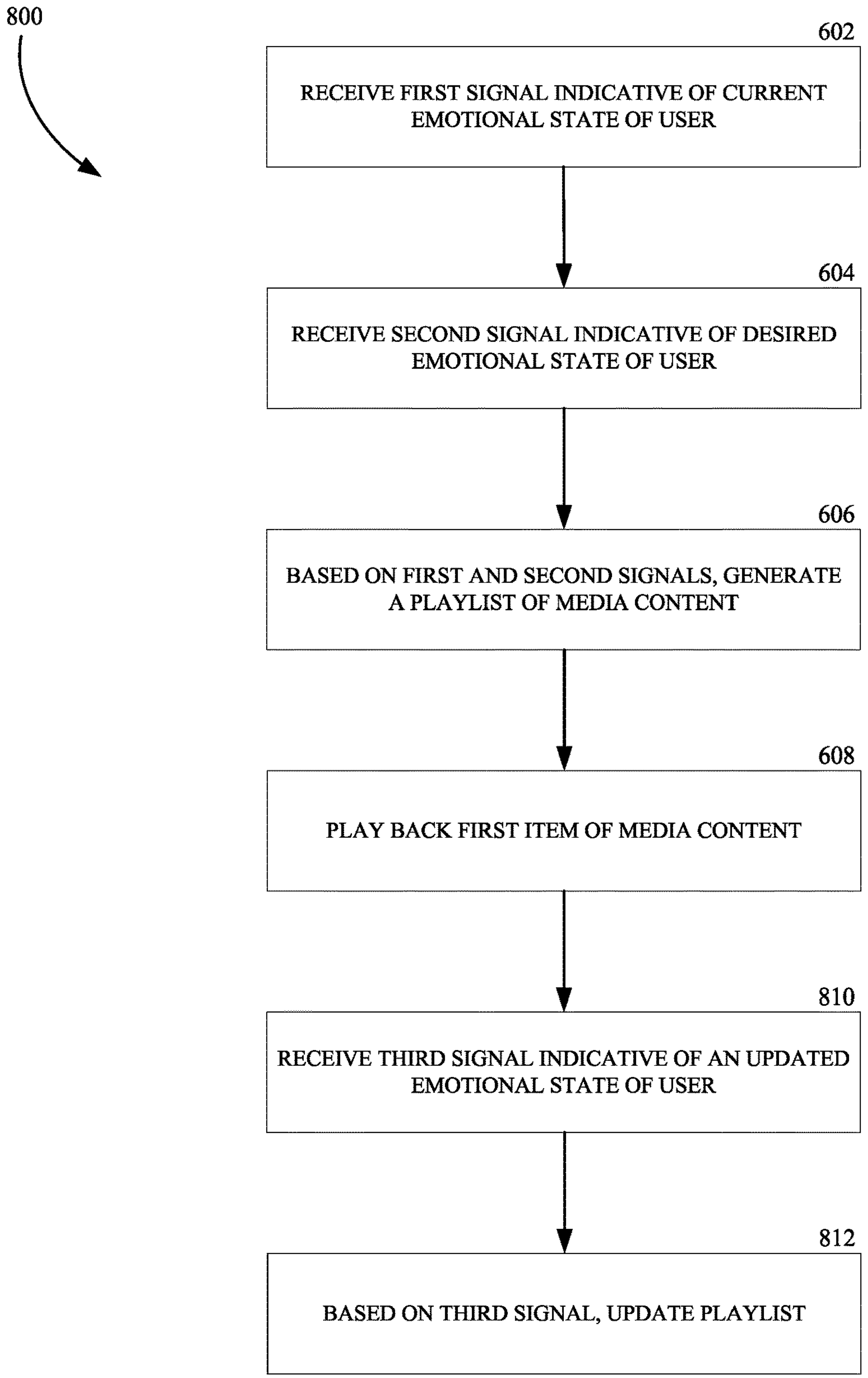

FIGS. 6-8 illustrate various methods for generating playlists of media content. In some embodiments, the processes described below include one or more instructions stored in memory (e.g., the memory 112*b*; FIG. 1) and executed by one or more processors (e.g., the processors 112*a*; FIG. 1) of a playback device (e.g., the playback device 110; FIG. 1). Additionally or alternatively, the instructions may be executed by one or more processors associated with other devices (e.g., remote computing devices 106, a network microphone device 120, a control device 130, etc.; FIG. 1).

FIG. 6 is a flow diagram of a method 600 for generating a playlist of media content based at least in part on an emotional state of a user, in accordance with embodiments of the present technology. The method 600 includes receiving a first signal indicative of a current emotional state of a user (process portion 602). The first signal can include sensor data (e.g., the sensor data 203; FIG. 2) received from a wearable sensor (e.g., the sensor 202; FIG. 2) or a non-wearable sensor and can correspond to brainwave data of the user. The first signal can be received by a playback device (e.g., the playback device 110*a*; FIG. 1C) and processed by the playback device's processing components (e.g., the processing components 204; FIG. 2) to produce a parameter, as described elsewhere herein (e.g., with reference to FIG. 2). In some embodiments, the parameter can correspond to a measurement or calculated value associated with the corresponding signal received from the user. In some embodiments, the parameter can correspond to a coordinate (i.e., a first coordinate) on a plane (e.g., the plane 400 or 500; FIGS. 4 and 5) that links the parameter to a particular emotion or emotional state. In such embodiments, the coordinate can include a valence value and an arousal value.

The method 600 further includes receiving a second signal indicative of a desired emotional state of the user (process portion 604). In some embodiments, the second signal is received from a control device (e.g., the control device 130; FIG. 1F) and corresponds to a user input. For example, a user may input or select from a list his or her desired emotional state (e.g., happy, pleased, relaxed, peaceful, calm, etc.). In some embodiments, the desired emotional state can be automatically determined by the system, for example, based on the current emotional state of the user and/or a history of use associated with the user. The second signal indicative of the desired emotional state can correspond to a parameter similar to that previously described. For example, the parameter corresponding to the desired emotional state can have a particular coordinate (i.e., a second coordinate) that is different than the first coordinate associated with the first signal.

The method 600 further includes, based at least in part on the first and second signals, generating a playlist of media content (process portion 606). The playlist can include items (e.g., audio content, songs, podcasts, video sounds, videos, etc.) that, when played back to the user, are configured to influence the user's emotional state and gradually transition the user from the current emotional state toward and/or to the desired emotional state. Stated differently, the items of the playlist are configured to transition the user from the current emotional state, to one or more intermediate emotional states, and then to the desired emotional state.

As explained in detail elsewhere herein (e.g., with reference to FIGS. 9A-9C), generating the playlist can include selecting the items of the playlist. The items can include a first item having a first parameter, e.g., corresponding to the current emotional state of the user, and an nth item having an nth parameter, e.g., corresponding to the desired emotional state of the user. As used herein, a parameter can be considered to correspond to an emotional state (e.g., a current emotional state or desired emotional state) of the user when the item of media content has a value that links the item to a particular emotion. Additionally or alternatively, a parameter can be considered to correspond to an emotional state when the item tends to (e.g., based on historical data) produce an emotional state in a user that can be mapped to or near that point on an emotion characterization plane (e.g., the planes 400, 500; FIGS. 4 and 5). In some embodiments the first and nth parameters may correspond to respective first and nth coordinates on a plane (e.g., the planes 400 or 500; FIGS. 4 and 5), which can define a pathway therebetween. In addition to the first and nth items, the generated playlist can include one or more intermediate items (e.g., a second item, third item, etc.) each having respective parameters and/or coordinates positioned on the pathway between the first and nth coordinates. Generating the playlist can further include arranging the items of the media content in a sequential order such that the playlist transitions from the first item, to the intermediate items, and then to the nth item. Because the playlists' items can each include a parameter (e.g., a coordinate or position on the emotion characterization plane 400 or 500) corresponding to an emotion, playing back the generated playlist in the arranged order can at least partially influence the user's emotional state to transition from the current emotional state toward or eventually to the desired emotional state.

Each of the playlist's items can be selected to be part of the playlist based on an association with a particular emotion or set of emotions. For example, the items may be selected from a database of media content items, and may include metadata linking a particular item to a particular emotion. Additionally or alternatively, each of the playlist's items can be selected based on factors associated with the user, such as the user's musical interest and/or demographic (e.g., age, gender, personality type, nationality, etc.). In some embodiments, the user's musical interest can be determined based on the user's profile on a media content mobile application (e.g., Spotify®, YouTube®, YouTube Music®, Apple Music®, Amazon Music®, etc.). Additionally or alternatively to the above-mentioned factors, the playlist's items may be based at least in part on a temporary or permanent condition (e.g., a medical condition) of the user. For example, if the user experiences depression, sleep deprivation, hyperactivity, attention-deficit, and/or other symptoms, the playlist may consider the condition, e.g., by selecting items known or expected to at least partially mitigate the associated symptoms.

The method 600 can further include playing back, via a playback device (e.g., the playback device 110*c*; FIG. 1C), the items of the media content (process portion 608). For example, the generated playlist is played back via the playback device in the arranged order such that the first item is played first, followed by the intermediate items, and finally the nth item. As explained in additional detail elsewhere herein, the user's emotional state can be continuously monitored while the items are being played back via the playback device. In doing so, the playlist can be updated, e.g., to ensure the user's emotional state is transitioning toward the desired emotional state. For example, if the user's emotional state sways off the pathway between the first and nth items, the playlist can be updated, e.g., to include new items not included on the previous playlist and transition the user's emotional state toward the desired emotional state.

FIG. 7 is a flow diagram of a method 700 for generating a playlist of media content based at least in part on an emotional state of a user. The method 700 is similar to the method 600 (FIG. 6) and includes previously described process portions 602, 604, 606, 608. The method 700 further includes receiving a third signal indicative of an updated emotional state of the user (process portion 710), and based on the third signal, playing back the second item of the playlist. Stated differently, after receiving the updated emotional state via the third signal, the pathway and arranged order of the playlist are maintained such that the second item of the playlist is played back for the user (e.g., after the first item is played back). In such embodiments, the updated emotional state received via the third signal corresponds to a parameter that is less than a predetermined threshold. As previously described with reference to FIG. 2, the parameter can correspond to a determined value, e.g., associated with the brainwave band power densities. For example, in such embodiments the parameter can correspond to a gradient change in the brainwave band power densities relative to a previous signal received from the user. In some embodiments, the parameter can correspond to a difference between an expected emotional state of the user at that time during playback and the updated emotional state of the user as determined using sensor data. The predetermined threshold can correspond to a maximum acceptable value below which the pathway and arranged order of the playlist remain unchanged. Stated differently, the predetermined threshold is a benchmark to determine whether the user's emotional state is transitioning as expected toward the desired emotional state, or alternatively is transitioning in a different direction (e.g., away from the desired emotional state). In some embodiments, if the user's emotional state is transitioning as expected and the parameter associated with the user's emotional state is below the predetermined threshold, the playlist and arranged order can be maintained. However, if the user's emotional state is transitioning in a different direction and the parameter associated with the user's emotional state is above the predetermined threshold, the playlist and/or the arranged order of the playlist may be adjusted. In such embodiments, the predetermined threshold value can be a dynamic value based, e.g., on the user, pathway, current emotion experienced by the user, etc. That is, the predetermined threshold value may not be a single constant value, but rather can vary depending on the user, pathway, current emotion experienced by the user, etc.

FIG. 8 is a flow diagram of a method 800 for generating a playlist of media content based at least in part on an emotional state of a user. The method 800 is similar to the method of method 600 (FIG. 6) and includes previously described process portions 602, 604, 606, 608. The method 800 further includes receiving a third signal indicative of an updated emotional state of the user (process portion 810), and based on the third signal, updating the playlist of media content (process portion 812). Stated differently, after receiving the updated emotional state via the third signal, the pathway and the playlist are updated to include at least one or more different items than that of the original playlist. In such embodiments, the updated emotional state received via the third signal corresponds to a parameter that is more than a predetermined threshold, indicating that the user's emotional state is not transitioning toward the desired emotional state in the expected manner. In response to the received third signal and/or the parameter being above the predetermined threshold, the playlist is updated to include one or more items different than the items on the original playlist. The updated playlist and its order are configured to gradually transition the emotional state of the user back toward the desired emotional state.

Figure 9A:
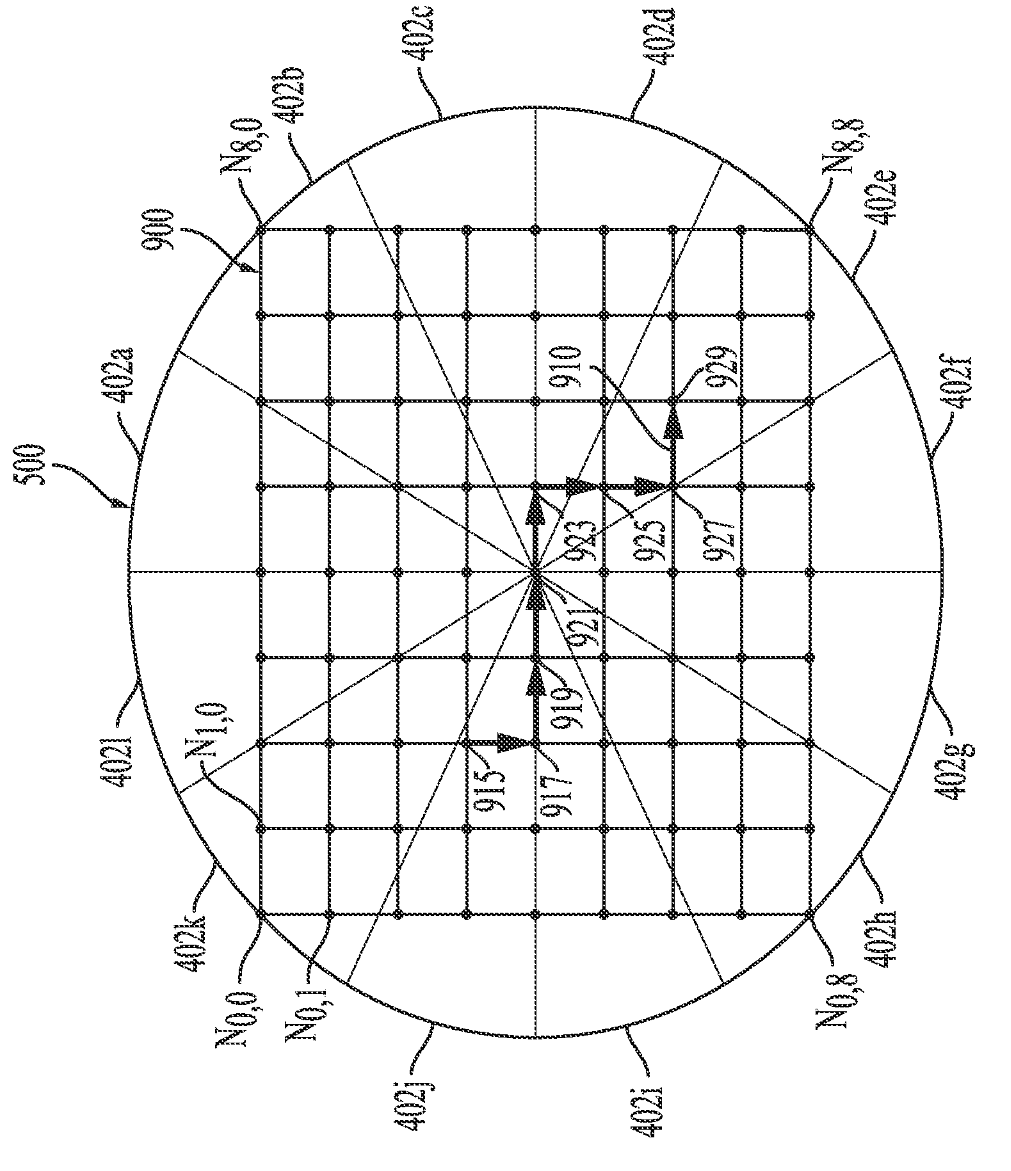
FIGS. 9A-9C are representative illustrations for generating a playlist of media content based at least in part on an emotional state of a user, in accordance with embodiments of the present technology.
Figure 9B:
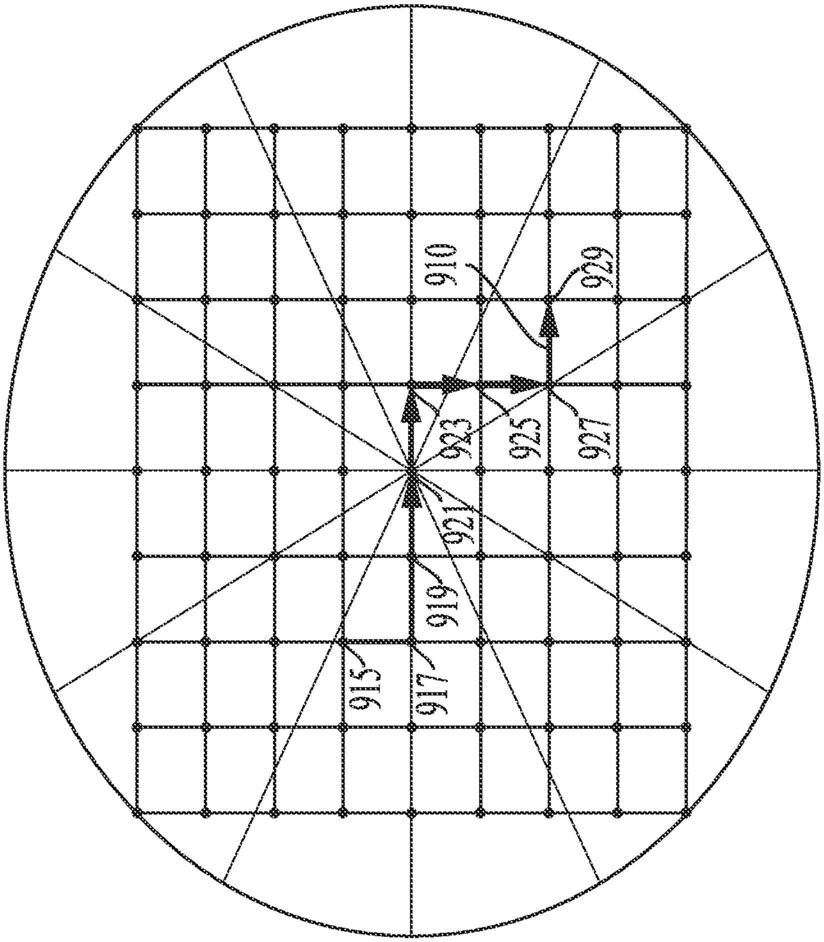
Figure 9C:
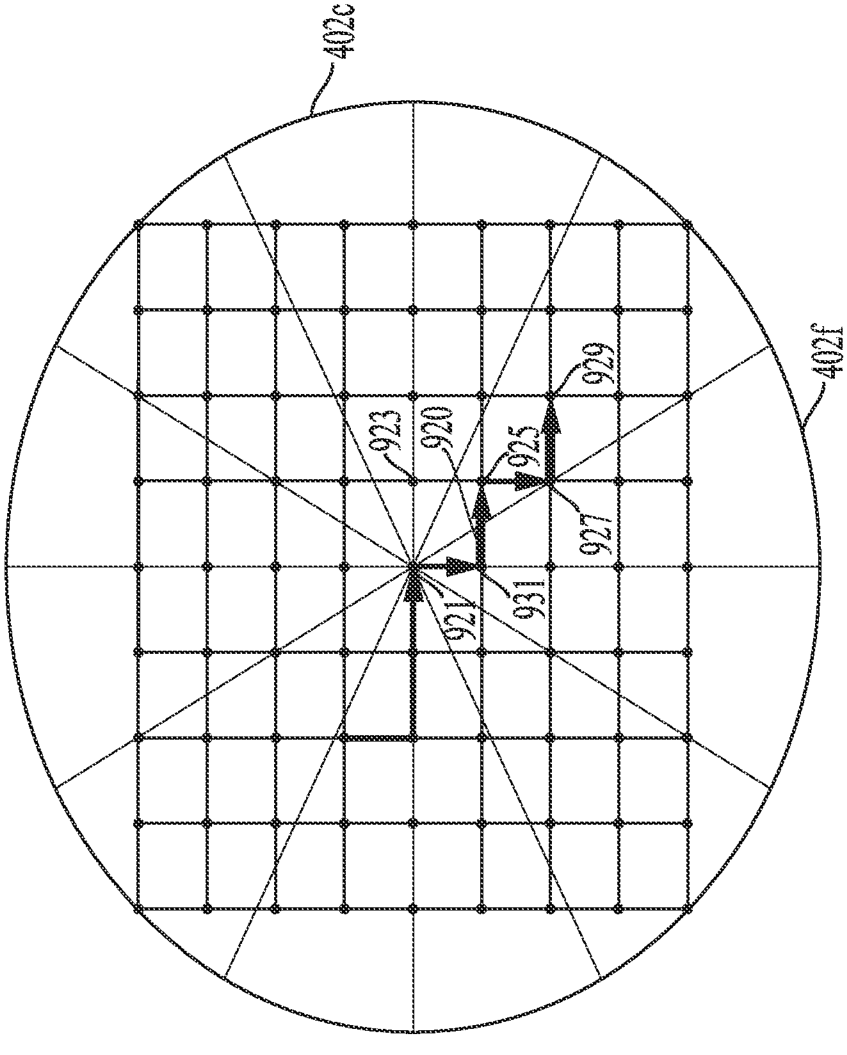

FIGS. 9A-9C are representative illustrations for generating a playlist of media content based at least in part on an emotional state of a user, in accordance with embodiments of the present technology. As shown in FIG. 9A, an array 900 is overlaid onto the plane 500 previously described with reference to FIG. 5. In some embodiments, the array 900 can be overlaid onto the plane 400, previously described with reference to FIG. 4. As previously described and shown in FIG. 9A, the plane 500 includes multiple sections 402*a-l* each corresponding to a distinct emotion. The array 900 includes a plurality of nodes (N) each corresponding to an item of media content, as previously described (e.g., with reference to FIGS. 6-8). That is, $N_{0,0}$ corresponds to a first item, $N_{1,0}$ corresponds to a second item different than the first item, and $N_{0,1}$ corresponds to a third item different than the first and second items. In some embodiments, the first item, second item, third item, etc. may each be selected from a list or database of multiple items associated with and/or specific to the respective first node, second node, third node, etc. Selection of the item for the particular node may be determined based on, e.g., a particular item's probability for affecting the user's emotional state (e.g., based on data from that user or other users) and/or whether the particular item has been shown to affect the user's emotional state in a previous occurrence. With each occurrence, the associated system for generating the playlist of the items can iteratively update the list or database of multiple items, e.g., based on the user's history or the history of other users similar to that user. The array 900 is overlaid onto the plane 500 such that each node (N) falls within a particular section 402*a-l* and thus the emotion associated therewith. As shown in FIG. 9A, the array 900 includes a 9×9 grid-like arrangement of nodes. However, in other embodiments, the array 900 can include more or less columns and/or rows (e.g., 5×5,6×8,10×10, 10×15, etc.), and/or have a different arrangement (e.g., a circle-like arrangement).

As shown in FIG. 9A, a pathway 910 (e.g., a first pathway) extends between (i) a first node 915 at $N_{2,3}$ corresponding to the user's current emotional state and (ii) an nth node 929 at $N_{6,6}$ corresponding to the user's desired emotional state, as described with reference to FIGS. 6-8. The pathway 910 also includes a second node 917 at $N_{2,4}$ a third node 919 at $N_{3,4}$ a fourth node 921 at $N_{4,4}$ a fifth node 923 at $N_{5,4}$ a sixth node 925 at $N_{5,5}$ and a seventh node 927 at $N_{5,6,}$ each of which corresponds to intermediate nodes between the first and nth nodes 915, 929. As described elsewhere herein, the pathway 910 corresponds to the playlist of media content, or more particularly the arranged order of the playlist, that is to be played back to the user. That is, the pathway's transition from the first node 915 to the second node 917 to the third node 919, etc., corresponds to playing back, via a playback device, the first item associated with the first node 915, the second item associated with the second node 917, the third item associated with the third node 919, etc. In doing so, the generated playlist is configured to transition the user's emotional state from the current emotional state toward and/or to the desired emotional state. For example, in the embodiment illustrated in FIG. 9A, the user's emotional state may transition from "nervous" (i.e., the emotion associated with section 402*j* which the first, second, and third nodes 915, 917, 919 are in), to neutral (i.e., the fourth node 921), to "pleased" (i.e., the emotion associated with section 402*c* which the fifth node 923 is in), to "peaceful" (i.e., the emotion associated with section 402*e* which the sixth, seventh and nth nodes 925, 927, 929 are in). In some embodiments, extension of the pathway 910 in the horizontal or vertical direction between the first and nth nodes 915, 929 is based on minimizing the greater difference in the horizontal or vertical direction between the current node (i.e., the item currently being played back via the playback device) and the nth node 929. For example, if the vertical distance between the current node and the nth node 929 is 3 and the horizontal distance between the current node and the nth node 929 is 2, then the pathway 910 may subsequently extend along the vertical axis for the next transition.

As described elsewhere herein, in some embodiments the user's current emotional state is constantly and/or iteratively monitored or measured (e.g., at predetermined intervals) to ensure the user's current emotional state is transitioning toward the desired emotional state or at least not in a direction opposite the desired emotional state. In such embodiments, as items of the playlist are played back via the playback device to the user in the arranged order defined by the pathway, the user's current emotional state is measured simultaneously. As explained in detail elsewhere herein (e.g., with reference to FIG. 9C), if the user's current emotional state transitions away from the desired emotional state or in an unexpected manner (e.g., not according to pathway), the pathway 910 may in response be updated, thereby also updating the items and/or arranged order of the playlist. Advantageously, this constant and/or iterative monitoring of the user's current emotional state (e.g., in real time) enables embodiments of the present technology to ensure the user's emotional state is transitioning toward the desired emotional state and, if not, make updates to the pathway 910 and corresponding playlist. That is, unlike conventional mood influencing media streaming services which do not monitor the user's current emotional state in real time, embodiments of the present technology are able to track a user's emotional response to a generated playlist associated with the pathway and make real-time adjustments to ensure the user's emotional state is transitioning toward the desired emotional state.

Referring next to FIG. 9B, the playlist has transitioned along the pathway 910 to the third node 919. That is, the playback device has transitioned along the pathway 910, playing back the first item associated with the first node 915 and the second item associated with the second node 917. During such playback, the user's current emotional state is iteratively measured, e.g., to ensure the user's current emotional state is not transitioning away from the desired emotional state or in an unexpected manner. As shown in FIG. 9B, the pathway 910 remains unchanged, indicating that the user's current emotional state thus far is transitioning at least partially toward the desired emotional state. Stated differently, since the pathway 910 remains unchanged, a parameter associated with the user's current emotional state is below a predetermined threshold, as previously described with reference to FIGS. 6-8.

Referring next to FIG. 9C, the pathway 910 (FIGS. 9A and 9B) has been updated to an updated pathway 920. Unlike the pathway 910 that extended to the nth node 929 via the fifth node 923 and section 402*c* corresponding to a "pleased" emotion, the updated pathway 920 now extends to the nth node 929 via an eight node 931 and section 402*f* corresponding to a "calm" emotion. The eight node 931 is associated with an item of media content different than that of the fifth node 923. As such, the updated pathway 920 corresponds to an updated playlist different than that of the original playlist associated with the original pathway 910. The reason for updating the pathway may be based, e.g., on the user's current emotional state transitioning away from the desired emotional state or in an unexpected manner. In such embodiments, the updated pathway 920 and associated playlist may be better suited to influence the user's current emotional state toward the desired emotional state, e.g., by playing back items different from those on the original pathway 910 and corresponding playlist.

In some instances, the media content played back to influence a user's emotional state can include generative content (e.g., generative audio content and/or generative visual content). As used herein, generative content includes media content that is generated in real-time or near-real-time using an algorithm or other non-human system utilizing rule-based computations to create a bespoke or customized composition. In various examples, the generative media content can be varied based on input from sensors or other parameters to influence a user's emotional state over time. Because generative media can be adjusted on a number of different characteristics, this approach may enable more fine-tuned control of a user's emotional state than selecting pre-recorded media content for a playlist.

Figure 10:
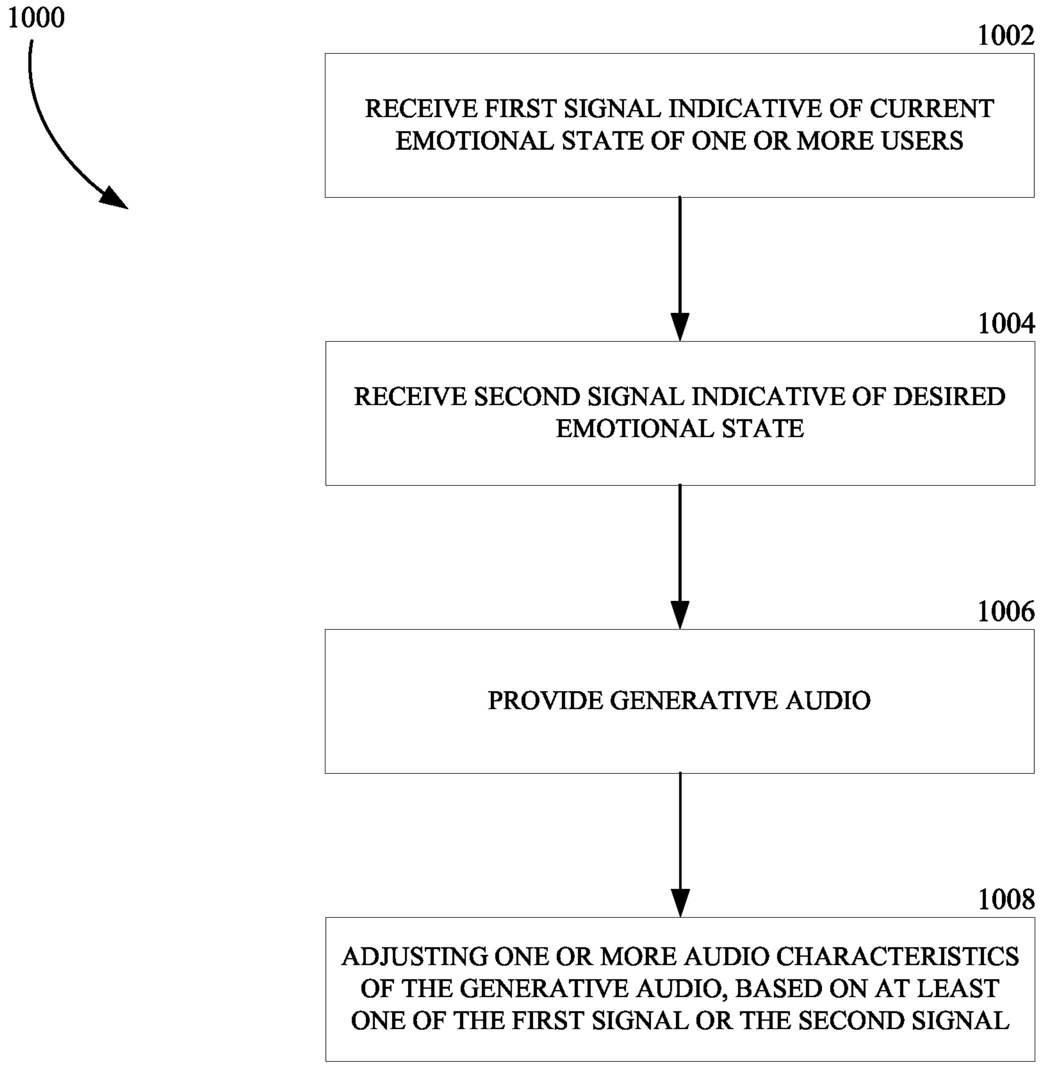
FIGS. 10 and 11 are flow diagrams of methods for generating a playlist of media content based at least in part on an emotional state of one or more users, in accordance with embodiments of the present technology.
Figure 11:
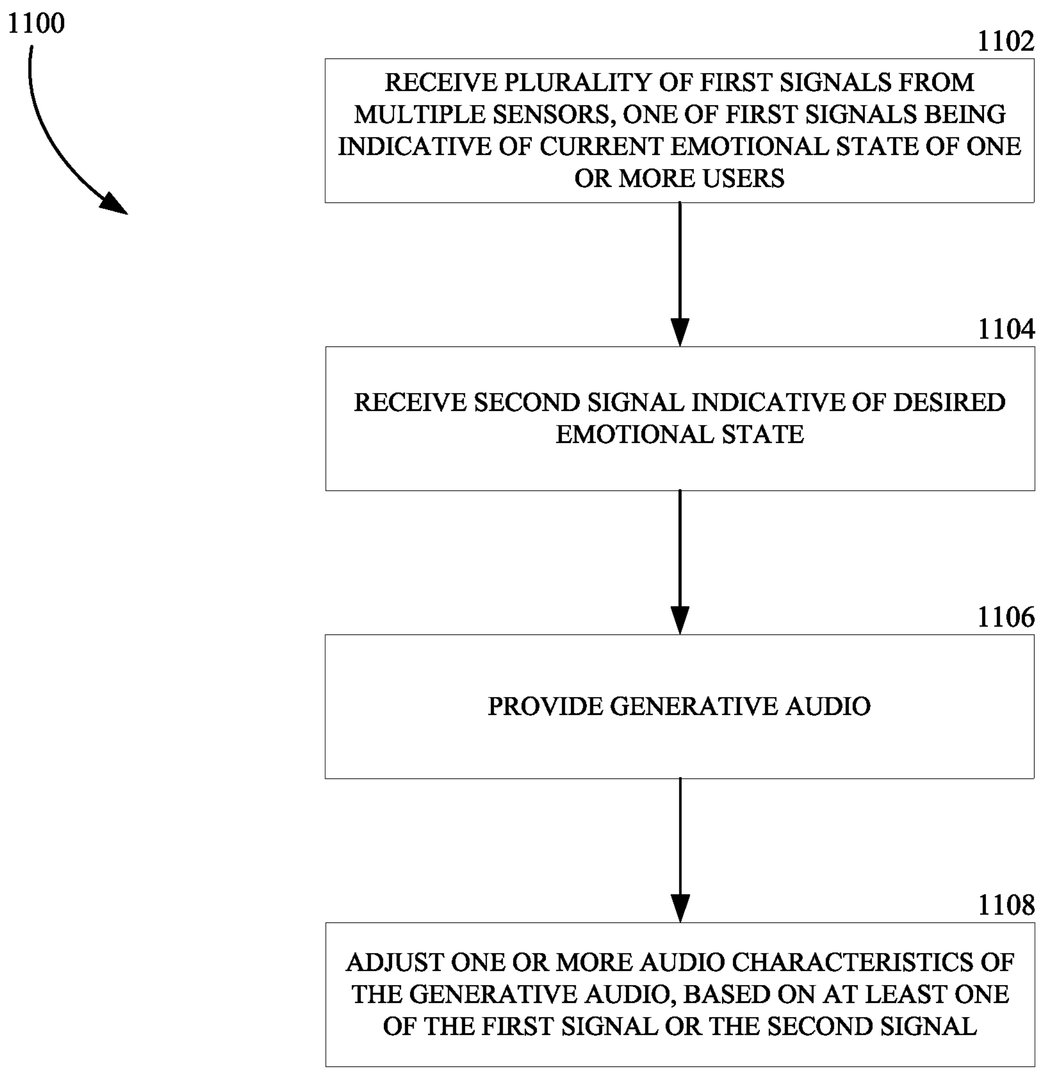

FIGS. 10 and 11 are flow diagrams of respective methods 1000, 1100 for generating a playlist of media content based at least in part on an emotional state of one or more users, in accordance with embodiments of the present technology. Referring first to FIG. 10, the method 1000 includes receiving a first signal indicative of a current emotional state of one or more users (process portion 1002). The first signal may be similar or identical to the first signal described with reference to FIG. 6 and method 600. For example, the first signal can include sensor data (e.g., the sensor data 203; FIG. 2) received from a wearable sensor (e.g., the sensor 202; FIG. 2) or a non-wearable sensor, as previously described. The sensor may be a single sensor or a plurality of sensors. In such embodiments, each of the plurality of sensors may be configured to gather different types of sensor data. The sensor data can correspond to, for example, brain activity, voice, location, movement, heart rate, pulse, body temperature, and/or perspiration of a user. The first signal can be received by a playback device (e.g., the playback device 110*a*; FIG. 1C) and processed by the playback device's processing components (e.g., the processing components 204; FIG. 2) to obtain a parameter, as described elsewhere herein (e.g., with reference to FIG. 2). In some embodiments, the parameter can correspond to a measurement or calculated value associated with the corresponding signal received from the user. That is, the parameter can correspond to or be partially indicative of a particular emotional state.

The method 1000 further includes receiving a second signal indicative of a desired emotional state of the user (process portion 1002). The second signal may be similar or identical to the second signal described with reference to FIG. 6 and method 600. For example, the second signal can be received from a control device (e.g., the control device 130; FIG. 1F) and correspond to a user input. For example, a user may input or select from a list his or her desired emotional state (e.g., happy, pleased, relaxed, peaceful, calm, etc.). In some embodiments, the desired emotional state can be automatically determined by the system, for example, based on the current emotional state of the user and/or a history of use associated with the user. The second signal indicative of the desired emotional state can correspond to a parameter, as previously described.

The method 1000 can further include providing generative audio (process portion 1006). The provided audio may be a playlist of distinct items or portions of generative audio each having different acoustic characteristics than one another. In such embodiments, the generative audio can be configured to be played sequentially to gradually transition the user from the current emotional state to or toward the desired emotional state. Generative audio can be any audio generated at least in part from an algorithm and/or non-human system utilizing a rule-based computer composition. As such, in some embodiments generative audio can be endless and/or dynamic audio that is altered (e.g., altered in real time) as inputs (e.g., parameters associated with the first, second, and/or other signals described herein) to the algorithm change. Additionally or alternatively, in some embodiments generative audio may be a media item (e.g., a song) with altered acoustic characteristics. Moreover, the generative audio may utilize one or more existing media items as a template that is altered based on inputs, for example, corresponding to the one or more users' current and/or desired emotional states. As an example, the generative audio may generally correspond to a media item that generally corresponds to an emotional state of the user.

The method 1000 can further include adjusting one or more audio characteristics of the generative audio, based on at least one of the first signal or the second signal (process portion 1008). Stated differently, adjusting the one or more audio characteristics of the generative audio can be based on the first signal, the second signal, or the first and second signals. The audio characteristics can include at least one of tempo, scale, pitch, beats per minute, bass, treble, mid-range volume, length, key, genre, or frequency content. As an example, a given media item can be adjusted to increase or decrease one or more of these audio characteristics to achieve a desired output. In some embodiments, adjusting the one or more audio characteristics may be based on an algorithm, and/or performed via a cloud network or remote computing device (e.g., a device other than a playback device of the user) or a local device (e.g., without utilizing a cloud network).

In some embodiments, the one or more audio characteristics of the generative audio can be adjusted to provide at least (i) a first portion of media content having a first parameter corresponding to the current emotional state (e.g., from the first signal referenced in process portion 1002), (ii) a second portion of media content having a second parameter different than the first parameter, and (iii) an nth portion of media content having an nth parameter corresponding to the desired emotional state. Each of the first portion, second portion, and nth portion can correspond to a single media item. Additionally or alternatively, transition between each of the portions can be seamless or without any substantial change in audio output. That is, unlike the transition between two songs in which there is a gap in audio output between one song ending and the other beginning, the transition between portions of generative audio need not have a gap in audio output. Instead, the transition may comprise altering a different acoustic characteristic or altering the same acoustic characteristic as the previous portion in a different manner. In such embodiments, each portion may correspond to a particular block of time during which the corresponding media item is played back to one or more users. For example, the first portion may correspond to a media item in which one or more acoustic characteristics (e.g., tempo) of the original media item has been adjusted (e.g., increased or decreased) based on the current emotional state, the second portion may correspond to the media item in which one or more acoustic characteristics (e.g., tempo and/or bass) has been adjusted relative to that of the first portion, and the third portion may correspond to the media item in which one or more acoustic characteristics (e.g., treble) has been adjusted relative to that of at least one of the first portion, second portion, or other previously provided portions.

Each portion (e.g., the first portion, second portion, etc.) provided to or played back for the user(s) can be configured to alter the emotional state of the user(s) generally toward the desired emotional state. As but one example, if a user has a current emotional state of bored and a desired emotional state of excited or happy, the first portion may correspond to the media item having a first tempo, the second portion may correspond to the media item having a second tempo greater than the first tempo, and the nth portion may correspond to the media item having a third tempo greater than the second tempo. In such examples, other acoustic characteristics in addition to tempo may also change for one or more of the portions. As another example, if a user has a current emotional state of excited and a desired emotional state of calm, the first portion may correspond to the media item having a first tempo, the second portion may correspond to the media item having a second tempo less than the first tempo, and the nth portion may correspond to the media item having a third tempo less than the second tempo.

In some embodiments, at least one of the first portion, second portion, or nth portion can correspond to a different media item. For example, the first portion may correspond to a first media item having a first parameter associated with the current emotional state, the second portion may correspond to a second media item having a second parameter, and the nth portion may correspond to an nth media item associated with an nth parameter associated with the desired emotional state, in which each of the media items are different from one another. In such embodiments, transition between the portions may still be without any gap in audio output, as previously described. Additionally or alternatively, in such embodiments each of the media items may comprise generative audio in that each media item includes at least one acoustic characteristic different than that of the original (e.g., unaltered) media item. For example, the first media item, chosen because it generally has a first parameter corresponding to the current emotional state, may have at least one of its acoustic characteristics altered to match the current emotional state more closely.

In some embodiments, generative audio may be played back (e.g., only played back) when the emotional state of the user does not correspond to any particular media item. That is, the system may generally select or determine media items that each have parameters corresponding to a corresponding emotional state of the user, and utilize or create generative audio only when no media item is available that corresponds to a particular emotional state. In such embodiments, the generative audio may be utilized to bridge the gap between two media items that correspond to different emotional states. For example, given a current emotional state, desired emotional state, and/or neutral state of a user, a generated playlist for the user may include a first item corresponding to the current emotional state, a second item corresponding to the desired emotional state, and generative audio to be played back between the first and second items to help transition the user from the current emotional state to the desired emotional state. In such embodiments, the generative audio may comprise portions of the first item, the second item, or the first and second items. Moreover, the generative audio may alter audio characteristics of the first item, second item, or first and second items.

In some embodiments, the system may generate a playlist that includes generative media that is layered on top of or integrated with existing media content. For example, nature sounds, melodious tunes, or the like may be layered over existing media content, and thereby played in a synchronous manner along with media items (e.g., media items with unaltered audio characteristics). In some embodiments, the generative media may be layered on top of other generative audio, as previously described. The layered generative audio may help progress the user toward the desired emotional state more effectively than play back of just the media content. Additionally or alternatively, in some embodiments the generative media may correspond to visual media or other non-audio media. For example, the generative media may be associated with a display of lights configured to be coupled to a lighting device and/or synchronously provided with the first, second, and nth portions or items.

In some embodiments, adjusting one or more audio characteristics of the generative audio may further be based on a third signal received while playing back one of the portions and that is indicative of an updated emotional state of the user. In doing so, the device or system can determine whether the emotional state of the user is progressing as expected toward the desired emotional state. If the emotional state of the user is not progressing toward the desired emotional state, as indicated by the third signal, further adjustments may be made to a subsequent portion of the generative audio to be played back to the user. In such embodiments, for example, the second portion may be adjusted to have a third parameter which corresponds to the updated emotional state of the user and which is different than the first and second parameters. As described elsewhere herein, by receiving updated emotional states from the user as the user is exposed to certain media, adjustments may be made to the media items or portions played back to the user to better ensure the emotional state of the user continues to progress toward the desired emotional state.

As shown in FIG. 11, the method 1100 can include process portions generally similar or identical to those of the method 1000 previously described. For example, the method 1100 can include receiving a plurality of first signals from multiple sensors, one of the first signals being indicative of current emotional state of one or more users (process portion 1102). Each of the first signals may be similar or identical to the first signal described with reference to process portion 1002 of method 1000. For example, the first signal can include sensor data (e.g., the sensor data 203; FIG. 2) received from a wearable sensor (e.g., the sensor 202; FIG. 2) or a non-wearable sensor, as previously described. The sensor may be a single sensor or a plurality of sensors. In such embodiments, each of the plurality of sensors may be configured to gather different types of sensor data. The sensor data can correspond to brain activity, voice, location, movement, heart rate, pulse, body temperature, and/or perspiration of a user. The first signal can be received by a playback device (e.g., the playback device 110*a*; FIG. 1C) and processed by the playback device's processing components (e.g., the processing components 204; FIG. 2) to produce a parameter, as described elsewhere herein (e.g., with reference to FIG. 2). In some embodiments, the parameter can correspond to a measurement or calculated value associated with the corresponding signal received from the user, and/or be partially indicative of a particular emotion or emotional state.

In some embodiments, the plurality of first signals may originate from the multiple sensors worn by different users. For example, one of the first signals may originate from a first sensor worn by a first user, another of the first signals may originate from a second sensor worn by a second user, and yet another of the first signals may originate from a third sensor not worn by a user and/or attached to a stationary structure. As described elsewhere herein, the plurality of the first signals may be utilized to generate a playlist, e.g., that includes generative audio. In some embodiments, the plurality of the first signals can generate a single playlist for multiple users or multiple playlists for multiple users.

The method 1100 can further include receiving a second signal indicative of a desired emotional state (process portion 1104). The second signal may be similar or identical to the second signal described with reference to FIG. 10 and method 1000 and/or FIG. 6 and method 600. For example, the second signal can be received from a control device (e.g., the control device 130; FIG. 1F) and correspond to a user input. In some embodiments, the desired emotional state may correspond to the desired emotional state for a group. For example, if the system were to generate a playlist for a group of individuals taking an exercise class, a desired emotional state of excited may be input. As another example, if the system were to generate a playlist for a group of infants in a childcare setting, a desired emotional state of sleepy may be input. In some embodiments, the desired emotional state can be automatically determined by the system, for example, based on the current emotional state of the user(s) and/or a history of use associated with the user(s). The second signal indicative of the desired emotional state can correspond to a parameter similar to that previously described.

The method 1100 can further include providing generative audio (process portion 1106). Process portion 1106 may be similar or identical to the process portion 1006 described with reference to FIG. 10 and method 1000. For example, the provided audio may be a playlist of distinct items of generative audio each having different acoustic characteristics than one another. In such embodiments, the playlist can be configured to be played sequentially to gradually transition the user from the current emotional state to or toward the desired emotional state. Additionally or alternatively, the generated playlist may be a single playlist to be provided to multiple users, or a plurality of different playlists to be provided to multiple users. In those embodiments in which a plurality of different playlists are provided, each of the playlists may differ based on the user for which the playlist is provided.

The method 1100 can further include adjusting one or more audio characteristics of the generative audio, based on at least one of the first signal or the second signal (process portion 1108). The process portion 1108 can be similar or identical to the process portion 1008 described with reference to FIG. 10 and method 1000. For example, in some embodiments, the one or more audio characteristics of the generative audio can be adjusted to provide at least (i) a first portion of media content having a first parameter corresponding to the current emotional state (e.g., from the first signal referenced in process portion 1002), (ii) a second portion of media content having a second parameter different than the first parameter, and (iii) an nth portion of media content having an nth parameter corresponding to the desired emotional state. Each of the first portion, second portion, and nth portion can correspond to a single media item. In such embodiments, each portion may correspond to a particular block of time during which the corresponding media item is played back to one or more users. For example, the first portion may correspond to a media item in which one or more acoustic characteristics (e.g., tempo) of the original media item has been adjusted (e.g., increased or decreased) based on the current emotional state, the second portion may correspond to the media item in which one or more acoustic characteristics (e.g., tempo and/or bass) has been adjusted relative to that of the first portion, and the third portion may correspond to the media item in which one or more acoustic characteristics (e.g., treble) has been adjusted relative to that of at least one of the first portion, second portion, or other previously provided portions.

As previously described, in some embodiments, generative audio may only be played back when the emotional state of the user does not correspond to any particular media item. In such embodiments, generative audio may be utilized as a bridge between two media items. For example, given a current emotional state, desired emotional state, and/or neutral state of a user, a generated playlist for the user may include a first item corresponding to the current emotional state, a second item corresponding to the desired emotional state, and generative audio to be played back between the first and second items. In such embodiments, the generative audio may comprise portions of the first item, the second item, or the first and second items.

Figure 12:
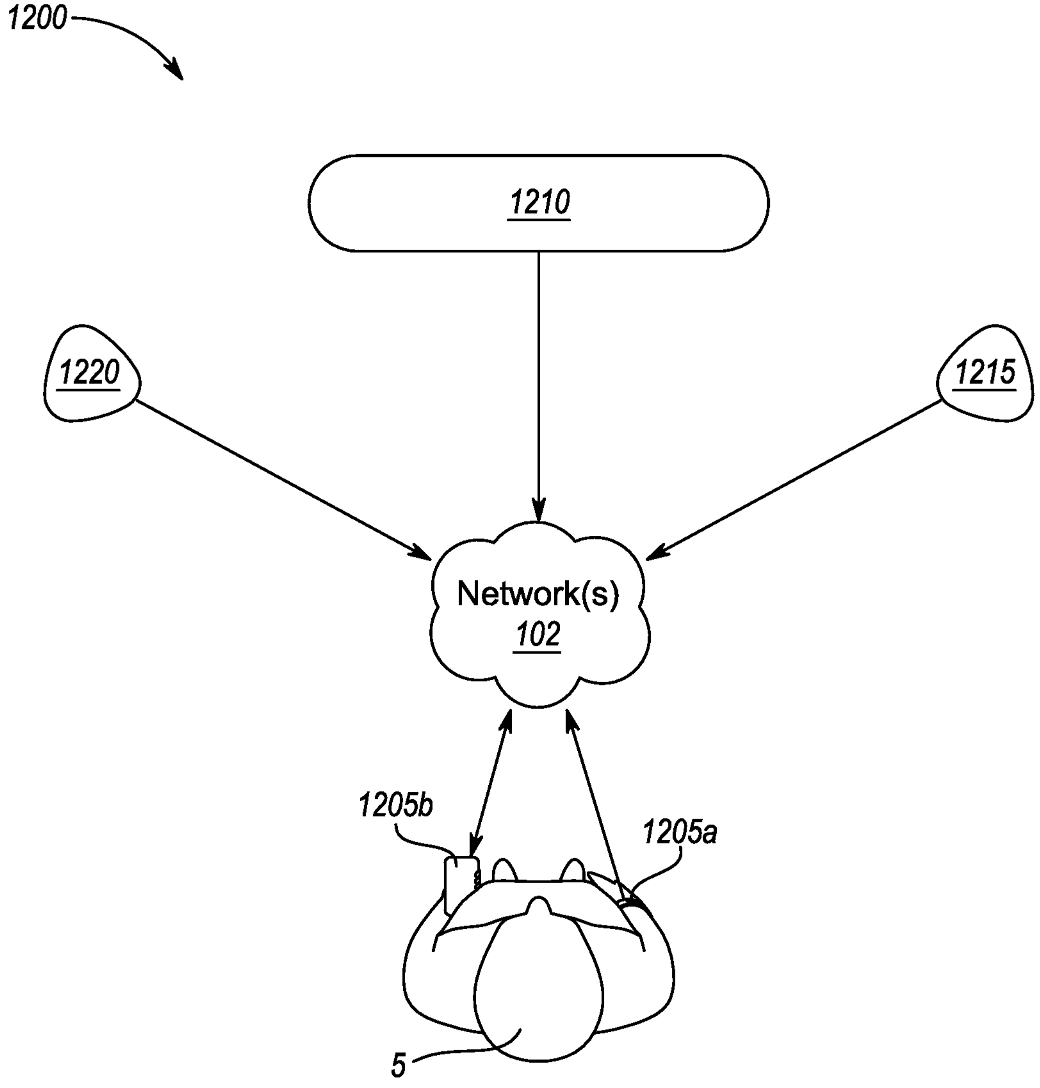
FIGS. 12 and 13 are schematic illustrations of a plurality of sensors communicatively coupled to a network, in accordance with embodiments of the present technology.
Figure 13:
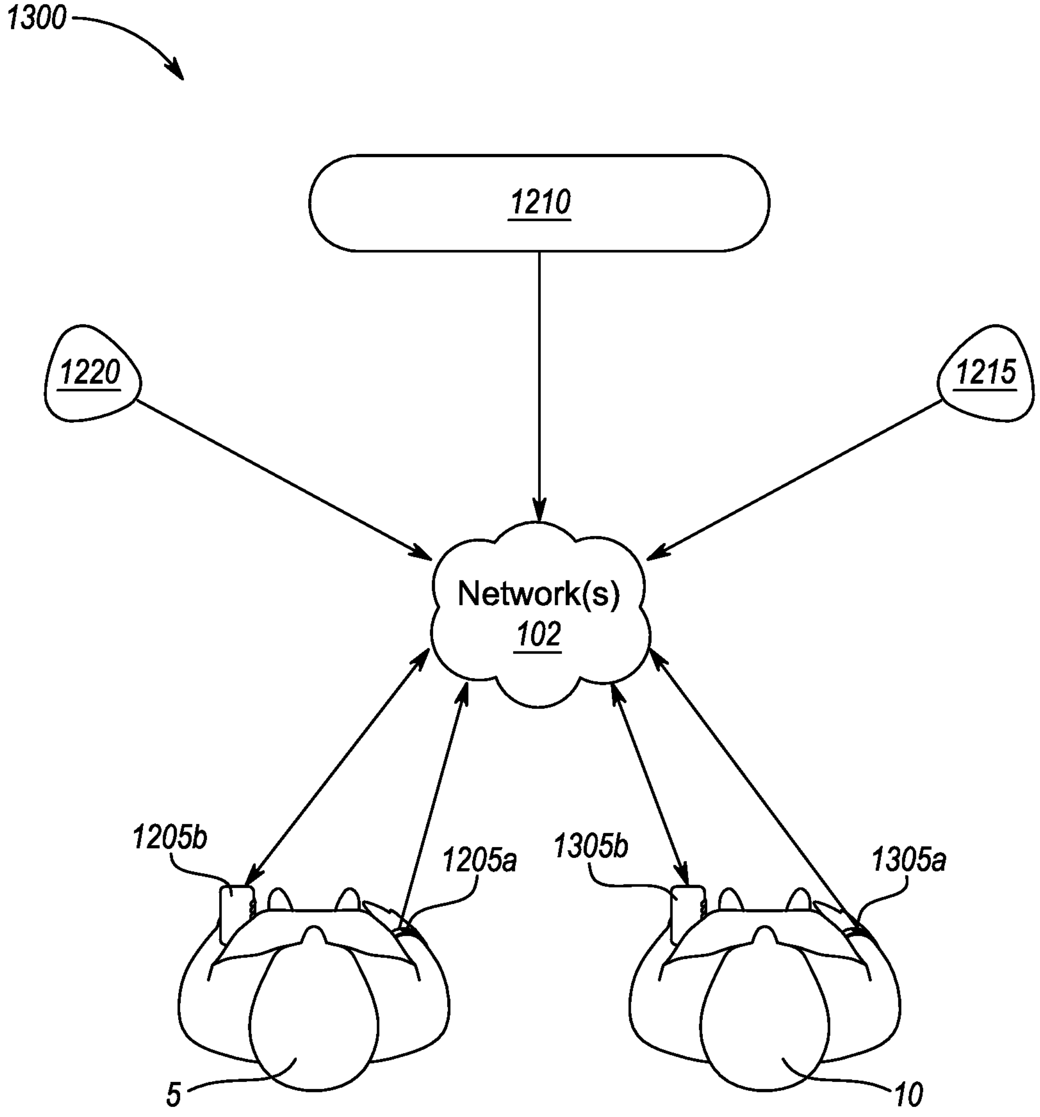

FIGS. 12 and 13 are schematic illustrations of systems 1200, 1300 for generating media content, in accordance with embodiments of the present technology. Each of the systems 1200, 1300 can generally be utilized to carry out any of the methods (e.g., methods 600, 700, 800, 1000, 1100) described elsewhere herein.

Referring first to FIG. 12, the system 1200 includes one or more sensors 1205*a*, 1205*b* worn or carried by a user 5 configured to gather sensor data from the user 5, an audio playback device 1210 configured to play back media for the user 5, and one or more sensors 1215, 1220 not worn or carried by the user 5 and configured to gather sensor data from the user. Each of the sensors 1205*a*, 1205*b*, 1215, 1220 and playback device 1210 can be bonded or communicatively coupled and generally configured to provide data to the network 102, as previously described. For example, the sensors 1205*a*, 1205*b*, 1215, 1220 may individually or collectively be configured to provide sensor data including or corresponding to brain activity, voice, location, movement, heart rate, body temperature, and/or perspiration.

As shown in FIG. 12, the sensors 1205*a*, 1205*b*, 1215, 1220 may generally be different types of sensors. For example, the first sensor 1205*a* carried by the user 5 can be a watch able to provide sensor data including body temperature, heart rate, and perspiration, the second sensor 1205*b* carried by the user can be a mobile device able to provide sensor data including location, and the third and/or fourth sensors 1215, 1220 not worn by the user can be fixed sensors able to provide sensor data including movement. In operation, the system 1200 can generate media content (e.g., a playlist of media items or portions, as previously described) based on these inputs, and/or other inputs from the sensors 1205*a*, 1205*b*, 1215, 1220 or the user 5 (e.g., the current and desired emotional states previously described). The media content may be generated via a remote computing device (e.g., a cloud network) or local device such as the playback device 1210. The media content can correspond to any of the media content or audio described elsewhere herein.

Referring next to FIG. 13, the system 1300 is generally similar to that of system 1200, but further includes a second user 10 and additional sensors 1305*a*, 1305*b* worn or carried by the second user 10. As shown in FIG. 13, the first and second users 5, 10 may be located in the same general location as one another. In other embodiments, the first and second users 5, 10 may be located in different locations from one another, for example with the first user 5 in a first city and the second user in a second, different city. Moreover, in some embodiments, data from other users (e.g., third, fourth, fifth, etc. users) in addition to the first and second users 5, 10 may also be considered. In such embodiments with multiple users, the location of the users may be utilized to generate a playlist and/or provide particular media content.

As previously described with reference to FIG. 12, each of the sensors 1205*a*, 1205*b*, 1215, 1220, 1305*a*, 1305*b* can be bonded or communicatively coupled to the network 102 (as previously described) and generally configured to provide data to the network 102. As also previously described, the system 1300 can generate media content, via a remote computing device (e.g., a cloud network) or local device such as the playback device 1210, based on these data inputs, and/or other inputs from the users 5, 10 (e.g., the current and desired emotional states). The generated media content can be provided back to the users 5, 10 via the playback device 1210 and/or other devices (e.g., devices 1205*b*, 1305*b*) worn or carried by the users 5, 10. In doing so, the generated playlist can be a single playlist provided to both the first and second users 5, 10, or first and second playlists provided to the respective first and second users 5, 10. In both such embodiments, the generated playlist(s) can be configured to transition the users 5, 10 toward the desired emotional state.

As an example of the embodiments described herein, the users 5, 10 may be part of an exercise class. As the class begins, the users 5, 10 may be provided with a first media item or portion (as previously described) that corresponds to their individual or collective current emotional states. As the users begin to exercise, individual sensors on each of the users 5, 10 can provide data to the network 102 which can be used to determine changes in, for example, heart rate, perspiration, or the like. Based on the data and other signals, such as the desired emotional state of each of the users 5, 10, the system 1300 (e.g., the playback device 1210 or remote computing device) can adjust the media content accordingly. Other examples include dance parties, art installations, religious or cultural celebrations, or other such group activities. Various other examples and use cases will be readily apparent to one of ordinary skill in the art.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present technology can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A playback device comprising: one or more amplifiers configured to drive one or more transducers; one or more processors; and tangible, non-transitory, computer-readable media storing instructions executable by the one or more processors to cause the playback device to perform operations comprising: receiving a first signal from a sensor, the first signal being indicative of a current emotional state of a user; receiving a second signal corresponding to a desired emotional state, the desired emotional state differing from the current emotional state; playing back generative audio via the one or more amplifiers; and after receiving the first signal and the second signal, adjusting one or more audio characteristics of the generative audio to provide at least (i) a first portion of media content having a first parameter corresponding to the current emotional state, (ii) a second portion of media content having a second parameter different than the first parameter, and (iii) an nth portion of media content having an nth parameter corresponding to the desired emotional state.

Example 2: The device of any one of the clauses herein, wherein the adjusting one or more audio characteristics comprises adjusting at least one of tempo, scale, pitch, beats per minute, bass, treble, mid-range volume, length, key, genre, or frequency content.

Example 3: The device of any one of the clauses herein, wherein the adjusting the one or more audio characteristics is based at least in part on the first signal, the second signal, or the first and second signals.

Example 4: The device of any one of the clauses herein, wherein the operations further comprise: playing back the first portion; while playing back the first portion, receiving a third signal indicative of an updated emotional state of the user; and modifying the second portion to have a third parameter corresponding to the updated emotional state of the user, wherein the third parameter is different from the first and second parameters.

Example 5: The device of any one of the clauses herein, wherein the operations further comprise: obtaining a neutral emotional state of the user; and sending two or more of the neutral emotional state, the first signal, and the second signal to one or more remote computing devices, wherein adjusting one or more audio characteristics of the generative audio comprises receiving the adjusted generative audio from the one or more remote computing devices.

Example 6: The device of any one of the clauses herein, the operations further comprising obtaining a neutral emotional state of the user by: providing one or more items of audio content to the user; and receiving from the user a response to each of the provided items of audio content.

Example 7: The device of any one of the clauses herein, wherein the sensor is configured to be worn by the user and to detect at least one of brain activity, voice, location, movement, heart rate, heart rate variation, body temperature, or perspiration of the user.

Example 8: The device of any one of the clauses herein, wherein adjusting the one or more audio characteristics of the generative audio comprises receiving data associated with the user's audio playback history, the history including at least one or more of items played back, time of playback, or location of the device during playback.

Example 9: The device of any one of the clauses herein, wherein the sensor is a first sensor and the first signal is a first sensor signal, the operations further comprising receiving a second sensor signal from a second sensor, and wherein adjusting one or more audio characteristics of the generative audio is based on the first and second sensor signals.

Example 10: The device of any one of the clauses herein, wherein the first sensor is a first type of sensor, and wherein the second sensor is a second, different type of sensor.

Example 11: The device of any one of the clauses herein, wherein the first sensor is configured to be worn by the user, and wherein the second sensor is configured to be attached to a fixed structure.

Example 12: The device of any one of the clauses herein, wherein the user is a first user and the sensor is a first sensor worn by the first user, the operations further comprising: receiving a signal from a second sensor worn by a second user; and receiving a signal from a third sensor worn by a third user, wherein adjusting one or more audio characteristics of the generative audio is further based on the received signals from the second and third sensors.

Example 13: The device of any one of the clauses herein, further comprising generating a playlist of visual content to be synchronously played back with the generative audio.

Example 14: A method comprising: receiving a first signal from a sensor, the first signal being indicative of a current emotional state of a user; receiving a second signal corresponding to a desired emotional state, the desired emotional state differing from the current emotional state; causing a playback device to play back generative audio; and after receiving the first signal and the second signal, adjusting one or more audio characteristics of the generative audio to provide at least (i) a first portion of media content having a first parameter corresponding to the current emotional state, (ii) a second portion of media content having a second parameter different than the first parameter, and (iii) an nth portion of media content having an nth parameter corresponding to the desired emotional state.

Example 15: The method of any one of the clauses herein, wherein adjusting one or more audio characteristics comprises adjusting at least one of tempo, scale, pitch, beats per minute, bass, treble, mid-range volume, length, key, genre, or frequency content.

Example 16: The method of any one of the clauses herein, wherein adjusting the one or more audio characteristics is based at least in part on the first signal, the second signal, or the first and second signals.

Example 17: The method of any one of the clauses herein, further comprising: playing back the first portion; and while playing back the first portion, receiving a third signal indicative of an updated emotional state of the user.

Example 18: The method of any one of the clauses herein, further comprising: obtaining a neutral emotional state of the user; and sending two or more of the neutral emotional state, the first signal, and the second signal to one or more remote computing devices, wherein adjusting one or more audio characteristics of the generative audio comprises receiving the adjusted generative audio from the one or more remote computing devices.

Example 19: The method of any one of the clauses herein, wherein the sensor is configured to be worn by the user, and wherein the first signal provided by the sensor corresponds to at least one of brain activity, voice, location, movement, heart rate, heart rate variation, body temperature, or perspiration of the user.

Example 20: The method of any one of the clauses herein, wherein adjusting the one or more audio characteristics of the generative audio comprises receiving data associated with the user's audio playback history, the history including at least one or more of items played back, time of playback, or location of the device during playback.

Example 21: The method of any one of the clauses herein, wherein obtaining a neutral emotional state comprises: providing one or more items of audio content to the user; and receiving from the user a response to each of the provided items of audio content.

Example 22: The method of any one of the clauses herein, wherein the sensor is a first sensor and the first signal is a first sensor signal, the operations further comprising receiving a second sensor signal from a second sensor, and wherein adjusting one or more audio characteristics of the generative audio is based on the first and second sensor signals.

Example 23: The method of any one of the clauses herein, wherein the first sensor is a first type of sensor, and wherein the second sensor is a second, different type of sensor.

Example 24: The method of any one of the clauses herein, wherein the first sensor is configured to be worn by the user, and wherein the second sensor is configured to be attached to a fixed structure.

Example 25: The method of any one of the clauses herein, wherein the user is a first user and the sensor is a first sensor worn by the first user, the method further comprising: receiving a signal from a second sensor worn by a second user; and receiving a signal from a third sensor worn by a third user, wherein adjusting one or more audio characteristics of the generative audio is further based on the received signals from the second and third sensors.

Example 26: The method of any one of the clauses herein, further comprising generating a playlist of visual content to be synchronously played back with the generative audio.

Example 27: The method of any one of the clauses herein, wherein the playlist comprises visual content.

Example 28: Tangible, non-transitory computer-readable media comprising instructions that, when executed by one or more processors of a playback device, cause the playback device to perform operations comprising: receiving a first signal from a sensor, the first signal being indicative of a current emotional state of a user; receiving a second signal corresponding to a desired emotional state, the desired emotional state differing from the current emotional state; play back generative audio via the playback device; and after receiving the first signal and the second signal, adjusting one or more audio characteristics of the generative audio to provide at least (i) a first portion of media content having a first parameter corresponding to the current emotional state, (ii) a second portion of media content having a second parameter different than the first parameter, and (iii) an nth portion of media content having an nth parameter corresponding to the desired emotional state.

Example 29: The computer-readable media of any one of the clauses herein, wherein adjusting one or more audio characteristics comprises adjusting at least one of tempo, scale, pitch, beats per minute, bass, treble, mid-range volume, length, key, genre, or frequency content.

Example 30: The computer-readable media of any one of the clauses herein, wherein adjusting the one or more audio characteristics is based at least in part on the first signal, the second signal, or the first and second signals.

Example 31: The computer-readable media of any one of the clauses herein, further comprising: playing back the first portion; and while playing back the first portion, receiving a third signal indicative of an updated emotional state of the user.

Example 32: The computer-readable media of any one of the clauses herein, further comprising: obtaining a neutral emotional state of the user; and sending two or more of the neutral emotional state, the first signal, and the second signal to one or more remote computing devices, wherein adjusting one or more audio characteristics of the generative audio comprises receiving the adjusted generative audio from the one or more remote computing devices.

Example 33: The computer-readable media of any one of the clauses herein, wherein the sensor is configured to be worn by the user, and wherein the first signal provided by the sensor corresponds to at least one of brain activity, voice, location, movement, heart rate, heart rate variation, body temperature, or perspiration of the user.

Example 34: The computer-readable media of any one of the clauses herein, wherein adjusting the one or more audio characteristics of the generative audio comprises receiving data associated with the user's audio playback history, the history including at least one or more of items played back, time of playback, or location of the device during playback.

Example 35: The computer-readable media of any one of the clauses herein, wherein obtaining a neutral emotional state comprises: providing one or more items of audio content to the user; and receiving from the user a response to each of the provided items of audio content.

Example 36: The computer-readable media of any one of the clauses herein, wherein the sensor is a first sensor and the first signal is a first sensor signal, the operations further comprising receiving a second sensor signal from a second sensor, and wherein adjusting one or more audio characteristics of the generative audio is based on the first and second sensor signals.

Example 37: The computer-readable media of any one of the clauses herein, wherein the first sensor is a first type of sensor, and wherein the second sensor is a second, different type of sensor.

Example 38: The computer-readable media of any one of the clauses herein, wherein the first sensor is configured to be worn by the user, and wherein the second sensor is configured to be attached to a fixed structure.

Example 39: The computer-readable media of any one of the clauses herein, wherein the user is a first user and the sensor is a first sensor worn by the first user, the method further comprising: receiving a signal from a second sensor worn by a second user; and receiving a signal from a third sensor worn by a third user, wherein adjusting one or more audio characteristics of the generative audio is further based on the received signals from the second and third sensors.

Example 40: The computer-readable media of any one of the clauses herein, further comprising generating a playlist of visual content to be synchronously played back with the generative audio.

Example 41: The computer-readable media of any one of the clauses herein, wherein the playlist comprises visual content.

Example 42: A playback device comprising: one or more amplifiers configured to drive one or more transducers; one or more processors; and tangible, non-transitory, computer-readable media storing instructions executable by the one or more processors to cause the playback device to perform operations comprising: receiving a plurality of first signals from multiple sensors, at least one of the first signals being indicative of a current emotional state of one or more users; receiving a second signal corresponding to a desired emotional state, the desired emotional state differing from the current emotional state; playing back generative audio via the one or more amplifiers; and after receiving the first signal and the second signal, adjusting one or more audio characteristics of the generative audio.

Example 43: The device of any one of the clauses herein, wherein the one of more users includes a first user and a second user, and the multiple sensors includes a first sensor worn by the first user, and a second sensor worn by the second user, wherein adjusting one or more audio characteristics of the generative audio is based on the received first signals from the first and second sensors.

Example 44: The device of any one of the clauses herein, wherein the generative audio is part of a playlist configured to alter the emotional state(s) of the first and second users to the desired emotional state.

Example 45: The device of any one of the clauses herein, wherein playing back the generative audio comprises playing back (i) a first playlist configured to alter the emotional state of the first user to the desired emotional state, and (ii) a second playlist, different than the first playlist, configured to alter the emotional state of the second user to the desired emotional state.

Example 46: The device of any one of the clauses herein, wherein receiving the second signal comprises receiving a plurality of second signals corresponding to a first desired emotional state of the first user and a second desired emotional state of the second user, and wherein playing back the generative audio comprises playing back (i) a first playlist configured to alter the emotional state of the first user to the first desired emotional state, and (ii) a second playlist, different than the first playlist, configured to alter the emotional state of the second user to the second desired emotional state.

Example 47: The device of any one of the clauses herein, wherein the multiple sensors includes a third sensor attached to a stationary structure, wherein adjusting one or more audio characteristics of the generative audio is based on the received first signals from the third sensor.

Example 48: The device of any one of the clauses herein, wherein adjusting comprises adjusting one or more audio characteristics of the generative audio to provide at least (i) a first portion of media content having a first parameter corresponding to the current emotional state, (ii) a second portion of media content having a second parameter different than the first parameter, and (iii) an nth portion of media content having an nth parameter corresponding to the desired emotional state.

The invention claimed is:

1. A method comprising:

receiving a first signal from a first sensor, the first signal being indicative of a current emotional state of a first user;

receiving a second signal from a second sensor worn by a second user, the second signal being indicative of a current emotional state of the second user;

receiving a third signal corresponding to a desired emotional state of at least one of the first user and the second user, the desired emotional state differing from the current emotional state of the first user;

causing a playback device to play back generative audio; and during play back of the generative audio, receiving an indication of an updated emotional state of at least one of the first user and the second user, determining an expected emotional state, for a current time, of at least one of the first user and the second user, wherein the determined expected emotional state, for the current time, of at least one of the first user and the second user, is different from each of the current emotional state of the first user, the current emotional state of the second user, and the desired emotional state of at least one of the first user and the second user, determining, based on the updated emotional state of at least one of the first user and the second user, a dynamic threshold corresponding to a maximum acceptable difference between the determined expected emotional state and the updated emotional state of at least one of the first user and the second user, below which audio characteristics of the generative audio remain unchanged, determining that a difference between the determined expected emotional state, for the current time, of at least one of the first user and the second user and the updated emotional state of at least one of the first user and the second user exceeds the determined dynamic threshold, and based on the first signal, the second signal, the third signal, and the difference between the determined expected emotional state, for the current time, of at least one of the first user and the second user and the updated emotional state of at least one of the first user and the second user, adjusting one or more audio characteristics of the generative audio.

2. The method of claim 1, further comprising receiving a fourth signal from a third sensor worn by a third user, wherein adjusting one or more audio characteristics of the generative audio is based on the received fourth signal from the third sensor.

3. The method of claim 1, further comprising generating a playlist of visual content to be synchronously played back with the generative audio.

4. The method of any-claim 1, wherein receiving the first signal comprises receiving a plurality of first signals from multiple sensors, at least one of the first signals being indicative of the current emotional state of the first user.

5. The method of claim 1, wherein the generative audio is part of a playlist configured to alter the emotional state(s) of the first and second users to the desired emotional state.

6. The method of claim 1, wherein playing back the generative audio comprises playing back (i) a first playlist configured to alter the emotional state of the first user to the desired emotional state, and (ii) a second playlist, different than the first playlist, configured to alter the emotional state of the second user to the desired emotional state.

7. The method of claim 1, wherein receiving the third signal comprises receiving a plurality of third signals corresponding to a first desired emotional state of the first user and a second desired emotional state of the second user.

8. The method of claim 1, wherein the generative audio comprises algorithmically generated audio based on one or more dynamically varying input parameter(s).

9. The method of claim 1, wherein the dynamic threshold is further based at least in part on a pathway between the current emotional state of at least one of the first user and the second user and the desired emotional state of at least one of the first user and the second user.

10. A media playback system comprising:

a playback device having one or more amplifiers configured to drive one or more audio transducers;

one or more processors; and data storage having instructions stored thereon that, when executed by the one or more processors, cause the media playback system to perform operations comprising:

receiving a first signal from a first sensor, the first signal being indicative of a current emotional state of a first user;

receiving a second signal from a second sensor worn by a second user, the second signal being indicative of a current emotional state of the second user, receiving a third signal corresponding to a desired emotional state of at least one of the first user and the second user, the desired emotional state differing from the current emotional state of the first-user, causing the playback device to play back generative audio, and during play back of the generative audio, receiving an indication of an updated emotional state of at least one of the first user and the second user, determining an expected emotional state, for a current time, of at least one of the first user and the second user, determining based on the updated emotional state of at least one of the first user and the second user, a dynamic threshold corresponding to a maximum acceptable difference between the determined expected emotional state and the updated emotional state of at least one of the first user and the second user, below which audio characteristics of the generative audio remain unchanged, determining that a difference between the determined expected emotional state, for the current time, of at least one of the first user and the second user and the updated emotional state of at least one of the first user and the second user exceeds the dynamic threshold, and based on the first signal, the second signal, the third signal, and the difference between the determined expected emotional state for the current time, of at least one of the first user and the second user and the updated emotional state of at least one of the first user and the second user, adjusting one or more audio characteristics of the generative audio.

11. The media playback system of claim 10, wherein the operations further comprise receiving a fourth signal from a third sensor worn by a third user, wherein adjusting one or more audio characteristics of the generative audio is based on the received fourth signal from the third sensor.

12. The media playback system of claim 10, wherein the operations further comprise generating a playlist of visual content to be synchronously played back with the generative audio.

13. The media playback system of claim 10, wherein receiving the first signal comprises receiving a plurality of first signals from multiple sensors, at least one of the first signals being indicative of the current emotional state of the first user.

14. The media playback system of claim 10, wherein the generative audio is part of a playlist configured to alter the emotional state(s) of the first and second users to the desired emotional state.

15. The media playback system of claim 10, wherein playing back the generative audio comprises playing back (i) a first playlist configured to alter the emotional state of the first user to the desired emotional state, and (ii) a second playlist, different than the first playlist, configured to alter the emotional state of the second user to the desired emotional state.

16. The media playback system of claim 10, wherein receiving the third signal comprises receiving a plurality of third signals corresponding to a first desired emotional state of the first user and a second desired emotional state of the second user.

17. The media playback system of claim 10, wherein the generative audio comprises algorithmically generated audio based on one or more dynamically varying input parameter (s).

18. One or more tangible, non-transitory computer-readable media comprising instructions that, when executed by one or more processors of a media playback system, cause the media playback system to perform operations comprising:

receiving a first signal from a first sensor, the first signal being indicative of a current emotional state of a first user;

receiving a second signal from a second sensor worn by a second user, the second signal being indicative of a current emotional state of the second user;

receiving a third signal corresponding to a desired emotional state of at least one of the first user and the second user, the desired emotional state differing from the current emotional state of the first user;

causing a playback device to play back generative audio; and during play back of the generative audio, receiving an indication of an updated emotional state of at least one of the first user and the second user, determining an expected emotional state, for a current time, of at least one of the first user and the second user, determining, based on the updated emotional state of at least one of the first user and the second user, a dynamic threshold corresponding to a maximum acceptable difference between the determined expected emotional state and the updated emotional state of at least one of the first user and the second user, below which audio characteristics of the generative audio remain unchanged, determining that a difference between the determined expected emotional state, for the current time, of at least one of the first user and the second user and the updated emotional state of at least one of the first user and the second user exceeds the dynamic threshold, and based on the first signal, the second signal, the third signal, and the difference between the determined expected emotional state, for the current time, of at least one of the first user and the second user and the updated emotional state of at least one of the first user and the second user, adjusting one or more audio characteristics of the generative audio.

19. The computer-readable media of claim 18, wherein the operations further comprise receiving a fourth signal from a third sensor worn by a third user, wherein adjusting one or more audio characteristics of the generative audio is based on the received fourth signal from the third sensor.

20. The computer-readable media of claim 18, wherein receiving the first signal comprises receiving a plurality of first signals from multiple sensors, at least one of the first signals being indicative of the current emotional state of the first user.

21. The computer-readable media of claim 18, wherein the generative audio comprises algorithmically generated audio based on one or more dynamically varying input parameter(s).

* * * * *